(12) United States Patent
Andersson et al.

(10) Patent No.: US 8,055,300 B2
(45) Date of Patent: Nov. 8, 2011

(54) SYSTEM AND METHOD FOR INDOOR COVERAGE OF USER EQUIPMENT TERMINALS

(75) Inventors: Sören Andersson, Sollentuna (SE); Jiuhui Du, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 863 days.

(21) Appl. No.: 11/896,038

(22) Filed: Aug. 29, 2007

(65) Prior Publication Data
US 2009/0061939 A1    Mar. 5, 2009

(51) Int. Cl.
    *H04M 1/00* (2006.01)
(52) U.S. Cl. .......... 455/562.1; 455/7; 455/8; 455/9; 455/561; 370/315; 370/320; 370/321
(58) Field of Classification Search .......... 455/7–10, 455/11.1, 12.1, 13.1–13.4, 14–20, 21–25, 455/561, 562; 370/315–321
See application file for complete search history.

(56) References Cited

U.S. PATENT DOCUMENTS

| | | | |
|---|---|---|---|
| 5,293,641 A | 3/1994 | Kallin et al. | |
| 5,668,562 A * | 9/1997 | Cutrer et al. | 343/703 |
| 6,021,329 A | 2/2000 | Kornestedt et al. | |
| 6,192,244 B1 | 2/2001 | Abbadessa | |
| 6,236,364 B1 | 5/2001 | Petersson et al. | |
| 6,339,399 B1 | 1/2002 | Andersson et al. | |
| 6,470,177 B1 | 10/2002 | Andersson et al. | |
| 6,587,451 B1 | 7/2003 | Kwon et al. | |
| 6,650,910 B1 | 11/2003 | Mazur et al. | |
| 6,693,971 B1 | 2/2004 | Kowalski | |
| 6,850,761 B2 | 2/2005 | Pallonen | |
| 6,992,622 B1 | 1/2006 | Chiang et al. | |
| 7,102,569 B2 | 9/2006 | Tan et al. | |
| 7,106,249 B2 | 9/2006 | Kubo et al. | |
| 7,577,398 B2 * | 8/2009 | Judd et al. | 455/11.1 |
| 2002/0164964 A1 * | 11/2002 | Stewart | 455/101 |
| 2003/0104781 A1 * | 6/2003 | Son | 455/22 |
| 2005/0254477 A1 * | 11/2005 | Lee et al. | 370/342 |
| 2008/0292012 A1 * | 11/2008 | Kim et al. | 375/260 |
| 2009/0017829 A1 * | 1/2009 | Laroia et al. | 455/446 |
| 2010/0029197 A1 * | 2/2010 | Judd et al. | 455/11.1 |

FOREIGN PATENT DOCUMENTS
WO    WO 97/13386    4/1997

OTHER PUBLICATIONS

Lee et al:, "Resource Reuse for 3G WOS," Personal, Indoor and Mobile Radio Communications, The 13$^{th}$ IEEE International Symposium, vol. 4, Sep. 15-18, 2002, pp. 1858-1862.

Park et al., "SPACE-MAC: Enabling Spatial Reuse using MIMO channel-aware MAC," Communications, ICC 2005, 2005 IEEE International Conference, vol. 5, May 16-20, 2005, pp. 3642-3646.

Datang Mobile—Products & Solutions—Network Solution; http://www.datangmobile.cn/en/Product&solution/TD-SCDMA/ns.htm; 4 pages.

* cited by examiner

Primary Examiner — Fayyaz Alam
(74) Attorney, Agent, or Firm — Nixon & Vanderhye P.C.

(57) ABSTRACT

Devices and methods to use base stations to communicate with user equipment (UE) terminals in an indoor setting are disclosed. For example, user equipments such as mobile telephone devices may be used in a building with multiple floors. The building may be supplied with antenna elements organized into antenna groups with each group serving an area of the building—a floor for example. The base station, utilizing the antenna groups, communicates with the UE terminals via one or more radio resources. The base station manages radio resources to communicate with multiple UE terminals. The base station selectively activates and deactivates the antenna groups to reduce multiple access interference and to efficiently utilize the radio resources.

26 Claims, 17 Drawing Sheets

TO BASE
STATION

TO BASE
STATION

TO BASE STATION

TO BASE STATION

SYSTEM AND METHOD FOR INDOOR COVERAGE OF USER EQUIPMENT TERMINALS

TECHNICAL FIELD

The technical field of this disclosure generally relates to providing radio communication service to user equipment (UE) terminals located indoors, such as in buildings. The technology described below provides indoor wireless communication coverage for UE terminals utilizing outdoor base station unit infrastructure.

BACKGROUND

UE terminals, such as cellular phones, can operate both indoors and outdoors. When the UE terminals are outdoors, the base station uses beam forming functions through smart antennas to enhance communication performance and reliability with the UE terminals. For example, signal-to-noise ratio (SNR) may be increased by using smart antennas.

FIG. 10 illustrates a conventional system 1000 that is used outdoors. The system 1000 includes a base station 1010 with antennas 1015 producing multiple beam lobes 1020. Beam forming circuitry 1012 coupled to the antennas 1015 controls the formation of the beam lobes 1020. Each beam lobe 1020 represents a wireless communication channel—a radio resource—used by the base station 1010 to communicate with a UE terminal. The radio resource may be either a common channel or a dedicated channel. When the base station broadcasts a same message to multiple UE terminals simultaneously, the common channel is used. But in most instances, the base station communicates with the UE terminals individually through dedicated channels.

In FIG. 10, four separate beam lobes 1020 are shown, each of which can represent individual dedicated channel, i.e. each beam lobe is a separate radio resource to communicate individually with four separate UE terminals. Each radio resource is separately identifiable based for example on a time slot (for TDMA systems), frequency (for FDMA systems), or spreading code (for CDMA systems).

Each beam lobe 1020 has a preferred direction, and any UE terminal within the range of the beam lobes 1020 may communicate with the base station 1010. The directional nature of the beam lobes 1020 enhances the quality of communication between the base station and the UE terminals by increasing the communication range of the base station, as compared to a similarly powered omni-directional signal. Also, the signal quality is enhanced by reducing the interference of the signals since the amount of overlap between the beam lobes is minimized.

Each beam lobe's directionality is achieved by controlling the amount of transmission power to each antenna 1015 for the radio resource associated with the beam lobe. For a particular radio resource corresponding to a particular beam lobe 1020, the amount of power of the wireless signal emanating from each antenna 1015 for that particular resource is also controlled by the beam forming circuitry 1012.

The beam forming circuitry 1012 sets a transmission weight factor (or simply weight factor) for each antenna for the particular radio resource. The weight factor can range anywhere between 0 and 1 representing between no power to full power being emanated from the antenna for the particular resource. The number of weight factors can be finite. For example, if the number of weight factors is nine, the weight factors may take on individual values 0.0, 0.125, 0.250, 0.375, 0.5, 0.625, 0.75, 0.875, and 1.0. The direction of each beam lobe 1020 can be controlled with finer detail as the granularity—i.e. the number—of the weight factor values between 0 and 1 increases.

For conventional systems, the number of weight factors is large. For a typical coverage of a communication sector of the base station ranging from −60 degrees to +60 degrees with a 1 degree accuracy, a total of 121 sets of weight factors are needed, where each set corresponds to a certain beam pointing direction within the −60 degrees to +60 degrees angular interval. The size of each set is determined by the number of antenna elements—where eight antenna elements is a typical number—and each individual weight factor can be any number between 0 and 1, with e.g. a four-decimal digit representation such as 0.1479. In the typical case, a total of 8×121 four-digit weight factors would be required. In this way, multiple beam lobes 1020, each representing a different radio resource, are produced simultaneously as seen in FIG. 10.

The system 1000 illustrated in FIG. 10 works well outdoors. Although the same system can be used to communicate with UE terminals located inside a building, it does not work as well indoors. Within the building, the UE terminals will all generally be in a same direction from the base station since they are all located close to each other. When dedicated channels, i.e., separate radio resources, are used for communication between the base station and each of the UE terminals located in the building, the beam lobes corresponding to the radio resources will also be formed in the same general direction. This increases the likelihood of interference. Also, no radio resource can be simultaneously reused by the base station to communicate with another UE terminal. Still further, signal bouncing and multiple access interference (MAI) is a bigger issue indoors due to the presence of physical features such as walls, floors and ceilings. MAI is caused by multiple user equipments using the same frequency allocation at the same time.

There are dedicated indoor solutions available. One indoor solution consists of placing small (also known as micro or pico) base stations in many places in a building. There are both upgrade and operational drawbacks to this solution. For upgrades, the main drawbacks includes complexity and the significant time needed to perform upgrades to hardware and software since each installation site must be visited. During operation, unnecessary interference is generated within the building since no centralized radio resource allocation can be provided. As a result, spectral efficiency of the communication network is severely compromised. Furthermore, handover procedure between adjacent base stations is difficult or non-existent.

Another indoor solution is to install a long RF feeder cable in the building connected to a base station located in the building and to connect several antennas to this RF feeder cable via a RF combining device placed at separate locations in the building. With this solution, it is not possible to use a specific antenna for transmission/reception. Instead, all antennas radiate power and hence generate unnecessary interference at the locations where a UE terminal may not be located.

These and other indoor solutions are dedicated to indoors and are separate from the existing outdoor based systems. Dedicated indoor solutions are expensive since they require separate equipments and increase complexity since they must be interfaced with the existing outdoor systems. Increased complexity is usually accompanied by decreased reliability.

SUMMARY

A base station for communicating with one or more user equipment (UE) terminals includes a plurality of antennas, a radio frequency (RF) unit, a beam forming unit, and a beam controller. The antennas transmit and receive wireless signals to and from the UE terminals. The RF unit is coupled to the antennas and provides power to each antenna. The beam forming unit is coupled to the RF unit and scales the power provided to each antenna by a weight factor for each radio resource. The beam controller controls the beam forming unit by setting the weight factor for each antenna for each radio resource.

Among the antennas of the base station, multiple antennas (indoor antennas) can be provided for coverage of indoors. An example of indoors is an interior space of a physical structure such as a building. The beam controller sets the weight factor for each indoor antenna to control transmission/reception of the wireless signals, i.e., radio resources, with indoor UE terminals reachable by the indoor antenna. In a preferred example, the weight factor set for each indoor antenna for each radio resource takes on one of two values ON or OFF.

In addition to the indoor antennas, the base station can also include outdoor antennas to provide outdoor beam forming functions for communications with UE terminals located outdoors. For the outdoor UE terminals, the number of weight factor values set can be numerous—at least three—to finely control the direction of the beam lobes (radio resources).

For indoors, a unique radio resource may be assigned to communicate with each indoor UE terminal reachable by the indoor antennas. In one preferred example, for an indoor UE terminal, an indoor antenna that receives the highest quality signal from the indoor UE terminal is chosen, and the weight factor is set to ON for the chosen indoor antenna for the assigned radio resource. The weight factors of other indoor antennas for the assigned radio resource are set to OFF. Each radio resource is individually identifiable based, for example, on at least one of a frequency, a time slot, or a spreading code.

When the indoor UE terminal moves from one location to another, a handover process is performed from a previous (first) indoor antenna to a next (second) indoor antenna that now receives the highest quality signal. In this situation, the weight factor for the second indoor antenna is set to ON for the assigned radio resource and the weight factor for the first indoor antenna is set to OFF for the same radio resource.

In an alternate preferred example where a unique radio resource is assigned to communicate with each indoor UE terminal, multiple indoor antennas may be used to communicate with the indoor UE terminal. For each indoor antenna that receives the signal from the indoor UE terminal with sufficient quality, the weight factor is set to ON for the assigned resource. For other antennas, the weight factor is set to OFF.

In another preferred example, natural attenuation of signals provided by the physical features such as walls, floors, and ceilings is used to implement simultaneous reuse of radio resources. In this preferred example, the indoors is divided into a plurality of coverage areas where each coverage area corresponds to an indoor antenna. To communicate with an indoor UE terminal, an indoor antenna that receives the highest quality signal from the indoor UE terminal is chosen, and the weight factor is set to ON for the chosen indoor antenna for the assigned radio resource. The assigned radio resource is unique among the radio resources currently used by the indoor antenna receiving the highest quality signal.

The same radio resource can be reused by another indoor antenna (corresponding to another coverage area) to communicate with another indoor UE terminal. This reuse is allowed since a signal from an indoor UE terminal in one coverage area is likely to be attenuated, due to the indoor features, to such an extent that the signal will not cause problematic interference in a different coverage area. In a preferred example, the coverage areas are divided into reuse zones where a common set of radio resources can be reused within each coverage area of the same reuse zone.

When the indoor UE terminal moves from one location (first coverage area) to another (second coverage area) in the example in which simultaneous reuse of radio resource is allowed, a handover process is performed from a previous (first) indoor antenna to another (second) indoor antenna that now receives the highest quality signal. In this situation, a new radio resource is assigned to communicate with the indoor UE terminal, and the weight factor for the second indoor antenna is set to ON for the new radio resource. The new radio resource can be the same or different from the first radio resource previously used between the first indoor antenna and the indoor UE terminal. Also, the weight factor for the first indoor antenna for the first radio resource is set to OFF.

Each antenna can comprise a single antenna element, a grouping of multiple antenna elements, or a distributed antenna element such as a leaky cable. Each antenna element is individually controllable by the base station. Further, multiple input multiple output (MIMO) schemes, such as using antenna elements with different polarizations, may be used to increase the data rate. The antennas can be a physically elongated or physically extended type.

A computer readable medium may be provided in which a computer program is stored for execution by a computer to control an outdoor base station to communicate with one or more UEs indoors.

DETAILED DESCRIPTION

For simplicity and illustrative purposes, the principles of the invention are described by referring mainly to example embodiments thereof. However, one of ordinary skill in the art would readily recognize that similar principles are equally applicable to many types of systems and methods for communication between one or more base stations and UE terminals located indoors as well as outdoors. The base station(s)

can be located outdoors. Also, the functional blocks and methods illustrated in the figures may be implemented in a variety of ways including, but not limited to, a software program, DSP, ASIC, etc. Advantageously, MAI is reduced in a cost effective manner by adapting outdoor base station functions and/or hardware for use indoors, and communication resource utilization is enhanced.

Figure 1:
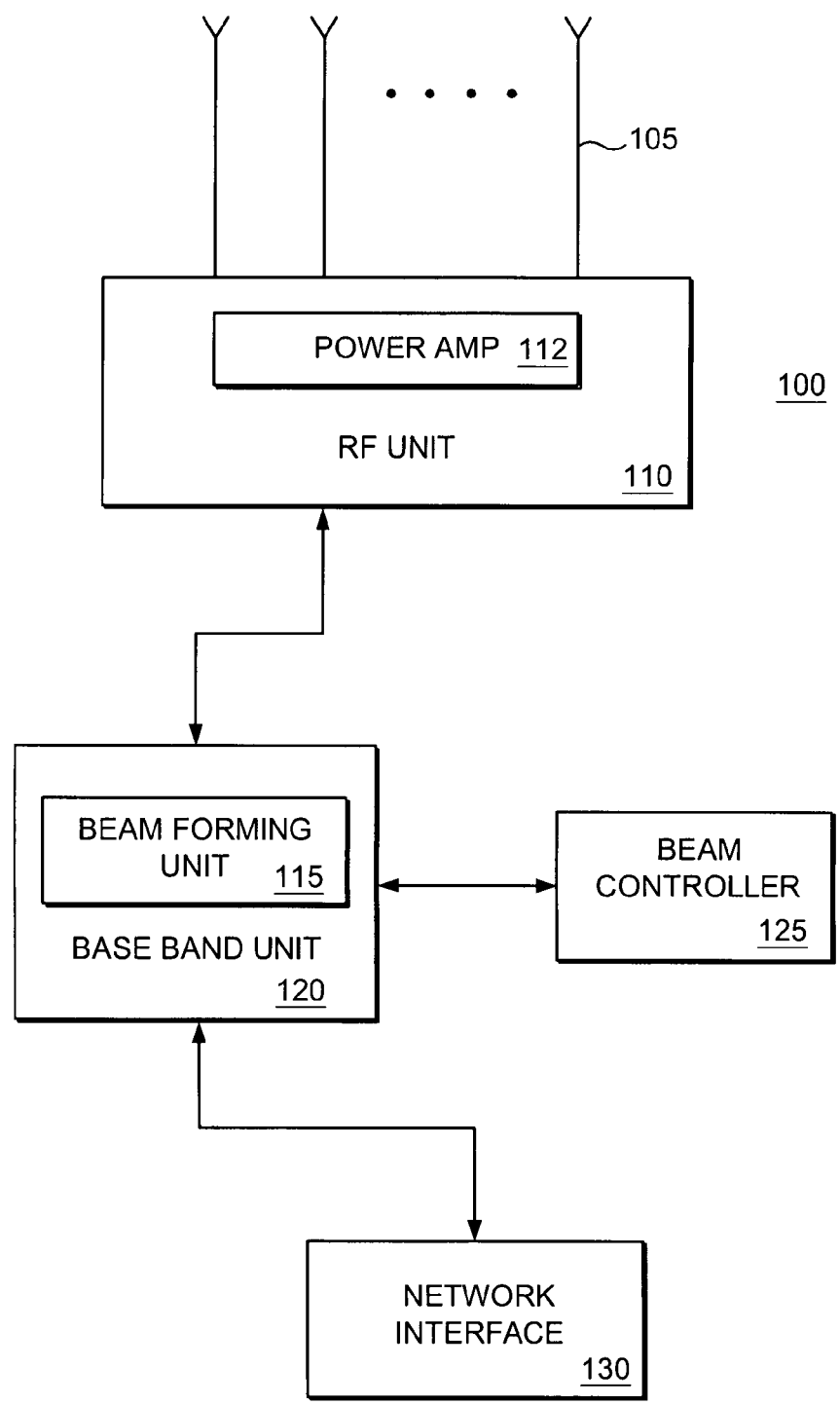
FIG. 1 illustrates an example embodiment of a base station used to communicate with UE terminals.

FIG. 1 illustrates an example base station 100 that can be used to communicate with UE terminals, where UE terminals can be located indoors or outdoors. The base station 100 includes plurality of antennas 105, which are configured to transmit and receive wireless signals to the UE terminals. The base station 100 also includes a radio frequency (RF) unit 110, a base band unit 120, a beam controller 125, and a network interface 130. The RF 110 unit is operatively coupled to the plurality of antennas 105 to provide RF signals to the antennas 105. The radio frequency unit 110 includes one or more power amplifiers to provide power such that the signals emanating from the antennas 105 are at desired amplitude levels.

The base band unit 120 processes data from the network interface 130, e.g., encoding, base band modulating, etc., provides the processed information to the RF unit 110 so that the data are upconverted to an RF signal and transmitted to the UE terminals via one or more antennas 105. The base band unit 120 also works in the other direction to demodulate data received from the UE terminals and provide the received data to the network interface 130.

A beam forming unit 115 included in the base band unit 120 is operatively coupled to the RF unit 110 and is configured to scale the power of each signal provided to each of the plurality of antennas 105 by a weight factor for each antenna 105. The beam controller 125 is configured to control the beam forming unit 115 by setting the weight factor for each antenna 105 for each communication channel, i.e., for each radio resource.

Figure 2:
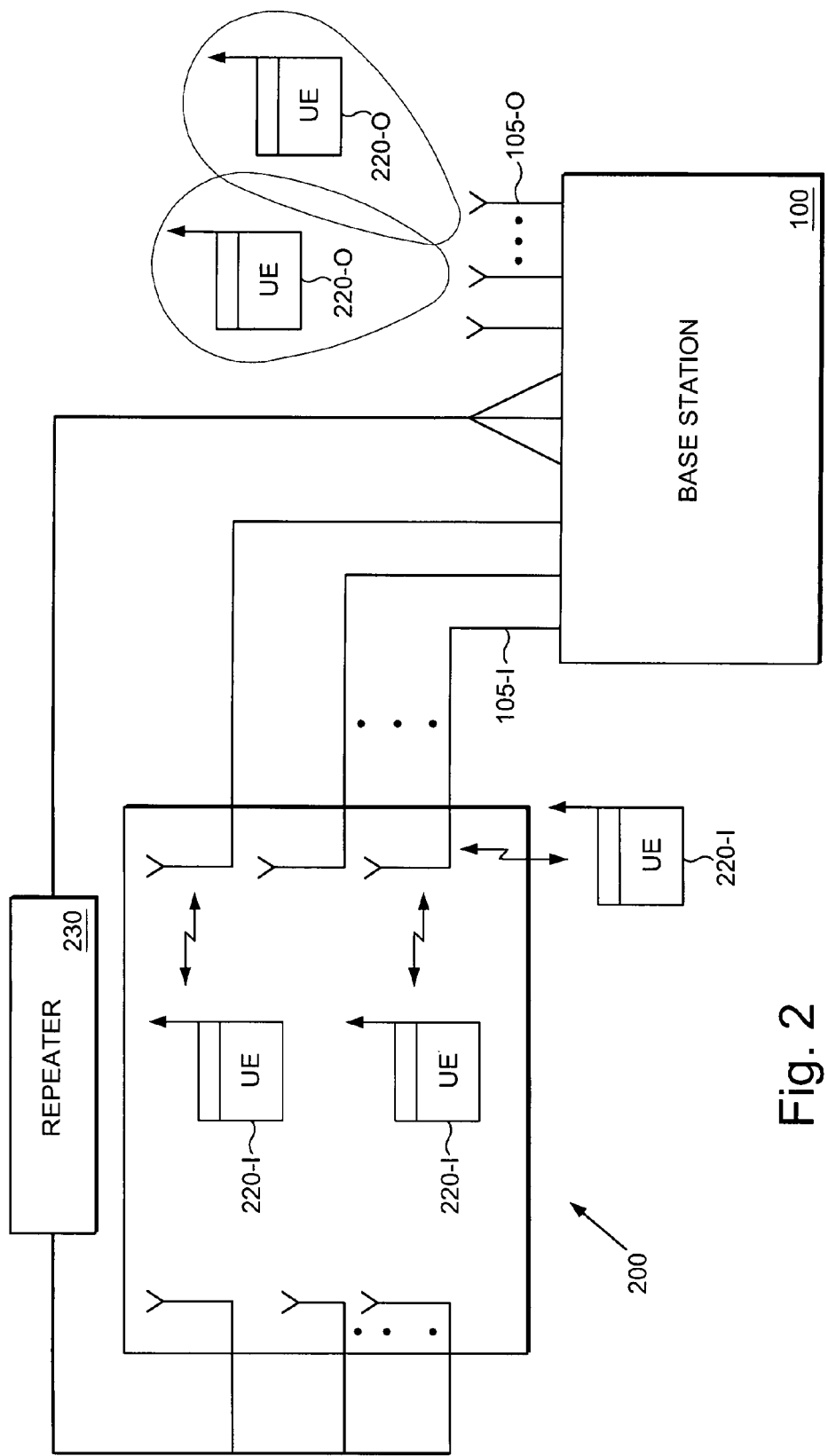
FIG. 2 illustrates an example communication system between the base station and the UE terminals.

As illustrated in FIG. 2, multiple antennas of the plurality of antennas 105 are used to provide coverage for indoors. In an example, indoors 200 can be an interior space of a physical structure such as a building. The term "indoors" is not limited to an interior of a physical structure. Indoors can define any space where directionality provided by traditional outdoor beam forming functions is less effective in communicating with the UE terminals. For explanation purposes, the antennas 105 that are operatively connected to the base station to provide indoor coverage are designated as indoor antennas 105-I. Also for explanation purposes, the antennas 105 that provide outdoor coverage are designated as outdoor antennas 105-O. Further, the UE terminals 220 reachable by the base station 100 through the indoor antennas 105-I and outdoor antennas 105-O are respectively designated as indoor UE terminals 220-I and outdoor UE terminals 220-O.

Some of the internal antennas 105-I are connected to the base station 100 through a repeater 230. The repeater 230 is not necessary, but is desirable in circumstances where cable connections between the antennas and the base station are long enough such that cable loss becomes a concern.

It is not necessary that the indoor antennas 105-I be physically located within the interior of the physical structure. It is sufficient that the placement of the indoor antennas 105-I be such that coverage for indoor UE terminals 220-I provided. Nor is it necessary for the UE terminals be located within the physical structure to be considered to be an indoor UE terminal 220-I. A UE terminal can be considered to be an indoor UE terminal 220-I if it is reachable through one or more indoor antennas 105-I as illustrated FIG. 2.

The base station 100 can optionally include multiple outdoor antennas 105-O that provide coverage for the outdoor UE terminals 220-O. In an example, for the outdoor antennas 105-O, the beam controller 125 sets the weight factors of each outdoor antenna 105-O to control the direction and/or the width of the antenna beam carrying the wireless signals for the outdoor UE terminals 220-O. In FIG. 2, beam lobes are shown to illustrate this directional control. The number of possible weight factors set for each outdoor antenna 105-O can be conventional, i.e. the number of weight factors can be three or more for the outdoor antennas 105-O.

In the indoor setting, the beam forming functions are modified, which allows for reuse of existing outdoor base station hardware, which in turn reduces cost. In an example, the weight factors set for each indoor antenna 105-I takes on one of two values ON and OFF. The value ON is not limited to delivering full power, i.e. does not necessarily equate with setting the weight factor to 1.0. It is sufficient that when a weight factor is set to ON for a radio resource, a signal with a predetermined amplitude level emanates from the indoor antenna 105-I for the radio resource for transmission/reception, and that the value ON is substantially the same for all indoor antennas 105-I when set.

It is desirable to calibrate the power delivered to each of the indoor antennas 105-I so that when the antennas are ON, each indoor antenna 105-I emanates substantially the same power, i.e., the amplitude level of the power output by the antenna itself is substantially the same for all indoor antennas 105-I. For example, an antenna that is close to the base station may require less power from the base station than an antenna that is relatively far since antenna cable loss will be less for the closer antenna. Such calibration reduces the effect of different antenna cable losses for each RF channel between an antenna and its corresponding output port of the base station.

Figure 3:
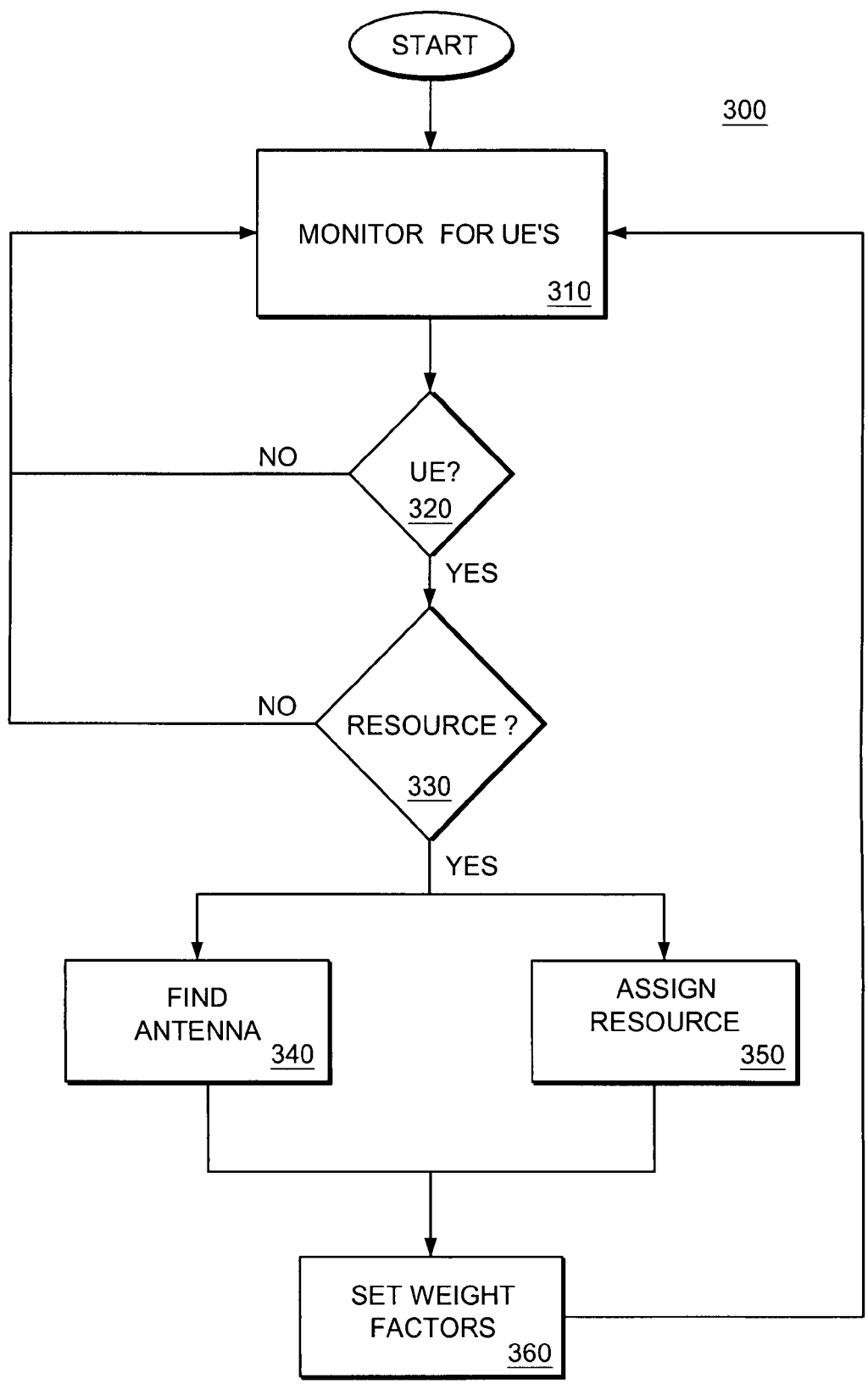
FIG. 3 illustrates an example method of establishing a communication (radio) resource between the base station and the UE terminals.

FIG. 3 illustrates an example method 300 of establishing communication between a base station and indoor UE terminals. In this example, for each indoor UE terminal, a radio resource allocated for use within the area covered by the indoor antennas is used to communicate with the indoor UE terminal. A radio resource can be a wireless communication channel of a certain frequency, a certain time slot, and/or a certain spreading code. Each radio resource used by the base station to communicate with individual indoor UE terminals may be identifiable based on the particular characteristics of frequency, time slot, and/or spreading code. There can be a limited number of these radio resources for communications between the base station and the indoor UE terminals.

In method 300, the base station 100 uses the indoor antennas 105-I to monitor access attempts from indoor UE terminals 220-I (step 310). In step 320, it is determined whether there is an access attempt from an indoor UE terminal 220-I. If no access attempt is detected, the method goes back to step 310. If an access attempt is detected, then it is determined whether a radio resource is available in step 330. If no radio resource is available, then the method goes back to step 310.

If the radio resource is available, then the method goes to steps 340 and 350. In step 340, an indoor antenna 105-I that receives highest quality signal from the indoor UE terminal 220-I is determined. In step 350, the radio resource is assigned. The assigned radio resource is distinguishable from the other radio resources currently used by the indoor antennas 105-I.

Then the method goes to step 360 in which the weight factor is set to ON for the indoor antenna 105-I that receives the highest quality signal for the radio resource. Also in step 360, the weight factors of all other indoor antennas 105-I are set to OFF for that assigned radio resource. In this way, only the indoor antenna 105-I that is receiving the highest quality signal is used to communicate with the particular indoor UE terminal 220-I. The interference is reduced since no other indoor antenna 105-I is communicating using that radio resource.

Referring back to FIG. 3, the method 300 selects the indoor antenna that receives the highest quality signal from the indoor UE terminal and sets the weight factors such that the selected indoor antenna is used to communicate with that indoor UE terminal. In an example, the quality of the signal can be determined based on a strength of the signal received by the indoor antenna from the indoor UE terminal. Alternatively or in addition to the strength of the signal, the quality can be determined based on a ratio of the received signal strength with the sum of the received noise strength.

Figure 4A:
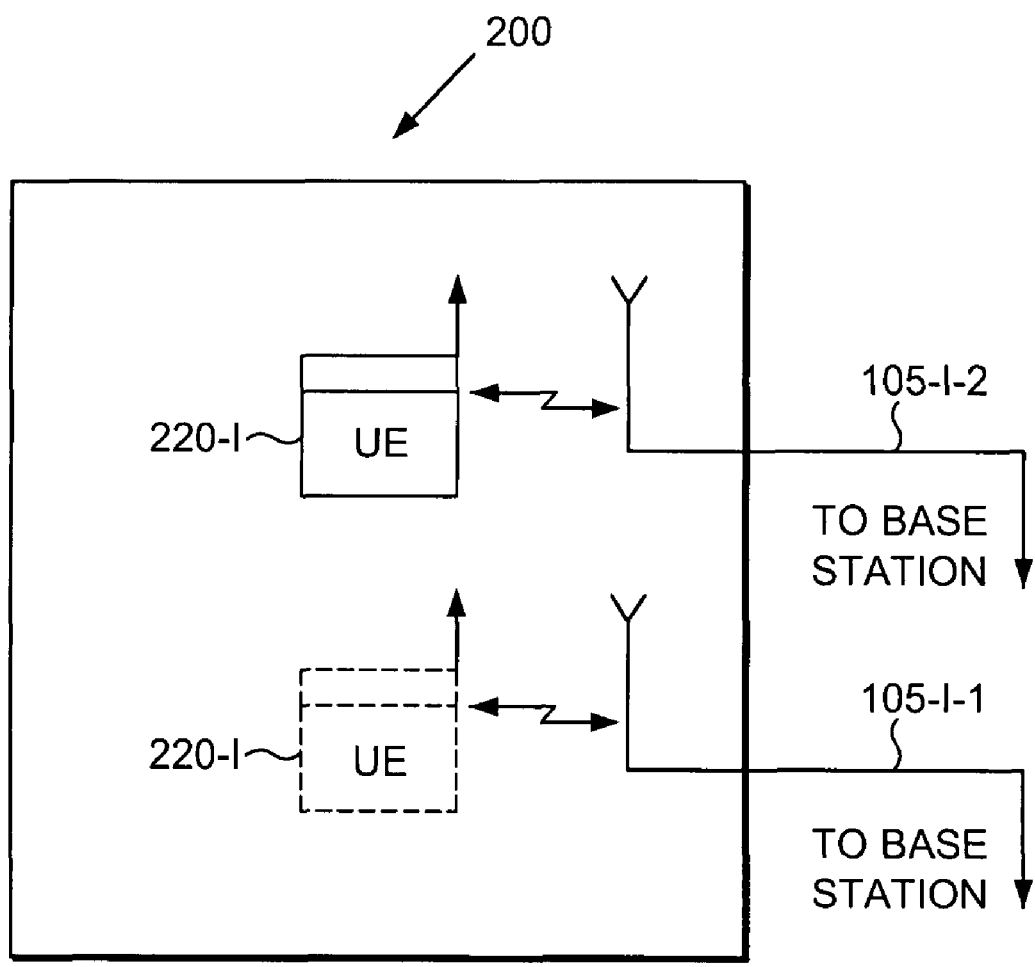
FIGS. 4A and 4B illustrate an example scenario and method of managing the radio resource that occurs when a UE terminal changes location.

Typically, the UE terminals are mobile whether indoors or outdoors, and therefore, can change locations over time. When an indoor UE terminal changes location, a different indoor antenna may receive the highest quality signal. This situation is depicted in FIG. 4A in which an indoor UE terminal 220-I moves from the dashed location where a first indoor antenna 105-I-1 initially receives the highest quality signal to the solid location where a second indoor antenna 105-I-2 currently receives the highest quality signal. To provide the most reliable service and to manage the radio resources, it is desirable for the second indoor antenna 105-I-2 to take over communication with the indoor UE terminal 220-I.

Figure 4B:
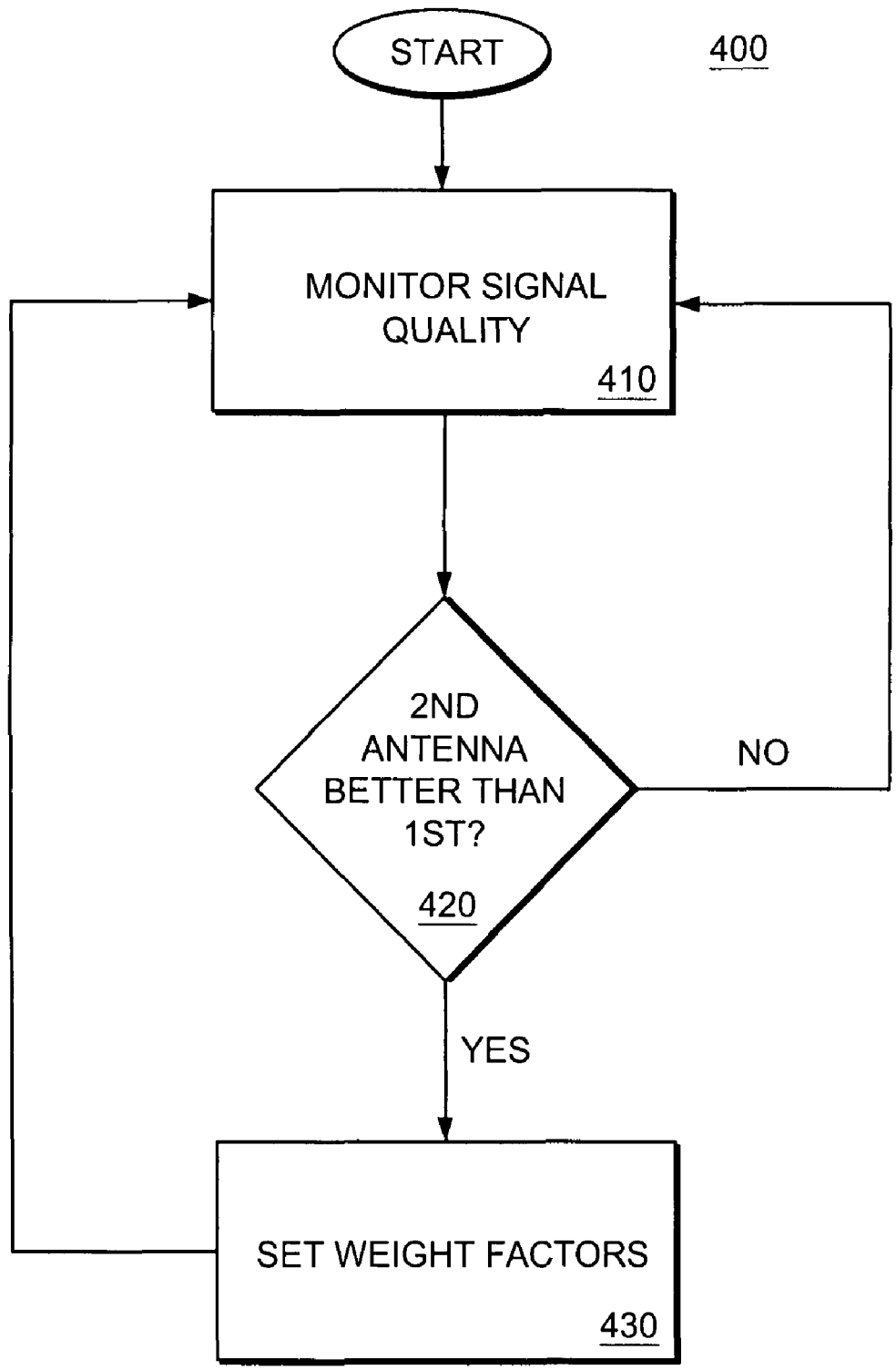

An example method 400 to achieve this handover is illustrated in FIG. 4B. As shown, the signal quality from the indoor UE terminal 220-I is monitored in step 410. For the purposes of explanation, it is assumed that the indoor UE terminal 220-I is currently in communication (using the radio resource) with the base station 100 through the first indoor antenna 105-I-1. In step 420, it is determined whether the second indoor antenna 105-I-2 receives a higher quality signal from the indoor UE terminal 220-I than the first indoor antenna 105-I-1. If not, the method goes back to step 410.

If the second indoor antenna 105-I-2 is receiving the higher quality signal, then the weight factors for the first and second indoor antennas 105-I-1 and 105-I-2 for the radio resource (communication channel) are adjusted accordingly in step 430. Namely, the weight factor of the second indoor antenna 105-I-2 is set to ON for the radio resource, and the weight factor of the first indoor antenna 105-I-1 is set to OFF for the same radio resource. The radio resource itself need not be changed. The radio resource can simply be handed off to the second indoor antenna 105-I-2.

In FIGS. 3, 4A and 4B, a unique radio resource within the indoor area covered by the base station is assigned to each indoor UE terminal reachable by the indoor antennas. Such a resource allocation scheme is relatively simple to implement. However, the number of indoor UE terminals that can be served is limited to the number of unique radio resources available for all of the indoor antennas.

Figure 5A:
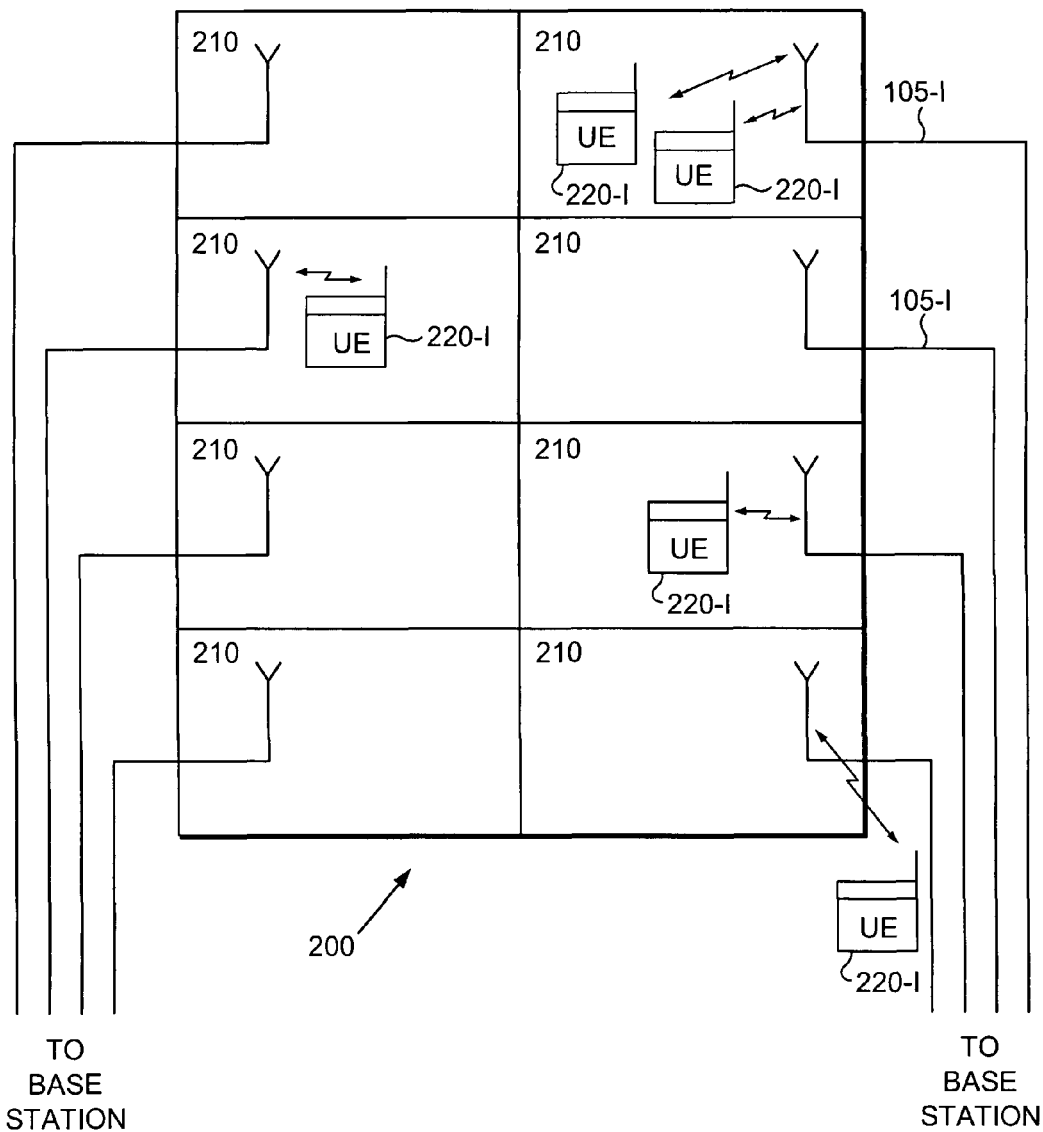
FIGS. 5A, 5B, 5C and 5D illustrate example scenarios and methods of managing the radio resources when an indoor setting is divided into multiple coverage areas.
Figure 5B:
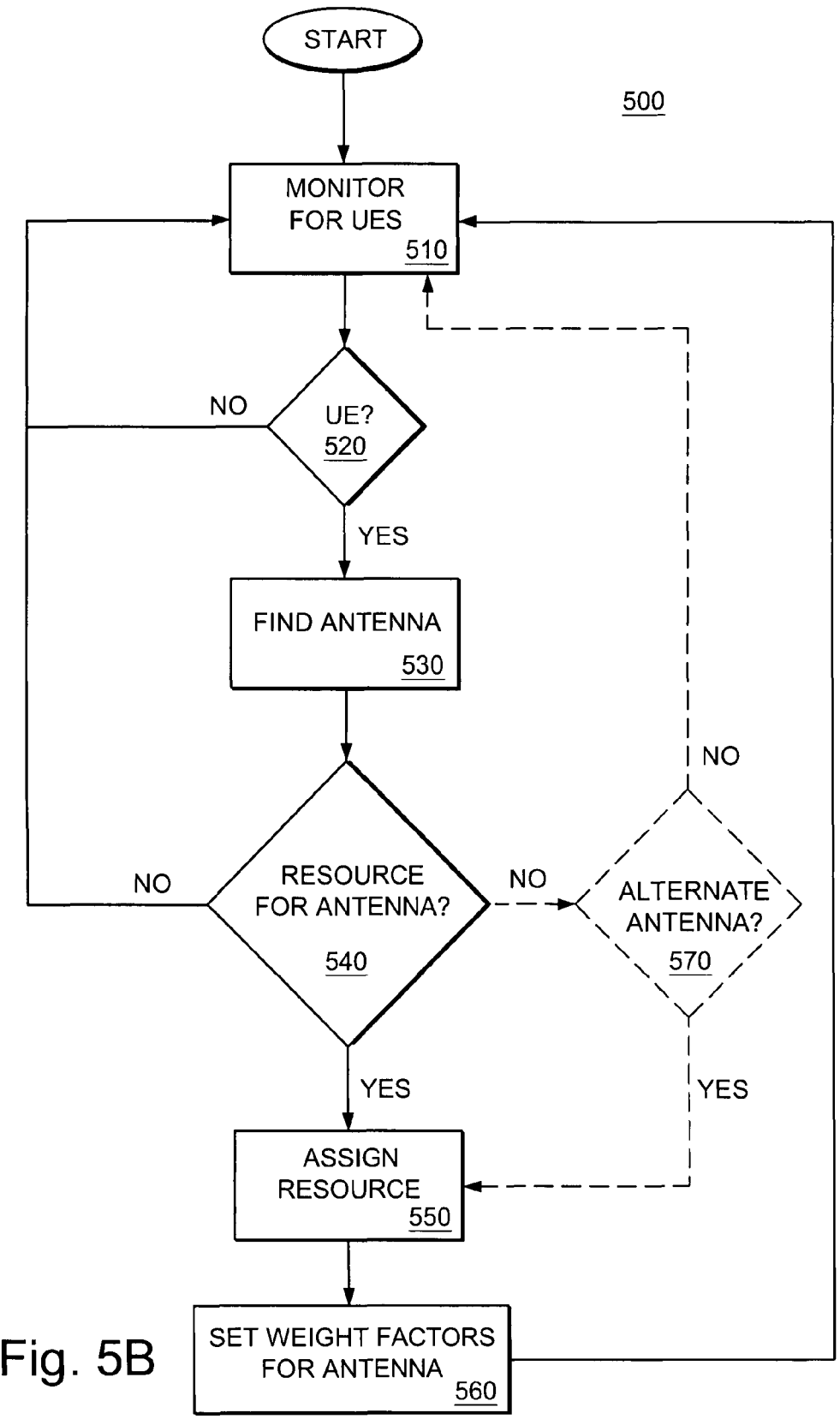

It would be desirable to simultaneously reuse the radio resources within the indoor area so that the number of indoor terminals that can be served increases. FIGS. 5A and 5B illustrate one example implementation to achieve this purpose. In FIG. 5A, the indoors 200 is divided into a plurality of coverage areas 210 such that each indoor antenna 105-I provides the best coverage for the indoor UE terminals 220-I within its corresponding coverage area 210.

Physical features such as walls, floors, and ceilings provide natural attenuation of wireless signals. The plurality of coverage areas 210 can be divided such that a wireless signal from an indoor UE terminal 220-I located in one coverage area 210 would be attenuated to the extent that it would not cause a problematic interference in another coverage area 210. The signal attenuation can occur simply due to the distance between antennas and UE terminals without any physical structure therebetween. Thus, the coverage areas 210 need not strictly correspond with physical building features like the floors, walls and ceilings.

FIG. 5B illustrates a method 500 for assigning a radio resource so that a base station can communicate with an indoor UE terminal and allow for reuse of the radio resource. In method 500, an access attempt from an indoor UE terminal 220 is monitored using the indoor antennas 105-I in step 510. While multiple indoor antennas can be used for monitoring purposes, in a situation where the coverage areas are aligned with the indoor antennas, only one indoor antenna is needed to monitor the access attempt from a particular indoor UE terminal. The signal from the particular indoor UE terminal would likely be attenuated to a significant degree before reaching other indoor antennas.

In step 520, it is determined whether there is an access attempt by the indoor UE terminal 220-I. If no access attempt is detected, then the method goes back to step 510. If the access attempt is detected, then in step 530, an indoor antenna 105-I that receives the highest quality signal among all indoor antennas 105-I from the indoor UE terminal 220-I is determined.

Then in step 540, it is determined whether a radio resource for the indoor antenna 105-I is available. If the radio resource is not available for the indoor antenna 105-I, then the method goes back to step 510. No radio resources may be available, for example, if the weight factors for all radio resources are currently set to ON for the antenna, i.e., all radio resources available to that indoor antenna are currently being used by the indoor antenna.

If the radio resource is available for indoor antenna 105-I, then in step 550, the radio resource is assigned for communication with the indoor UE terminal 220-I through the indoor antenna 105-I. The assigned radio resource is different from all other radio resources currently used by the indoor antenna 105-I that is receiving the highest quality signal. In step 560, the weight factor is set to ON for the radio resource for the indoor antenna 105-I receiving the highest quality signal.

In method 500, it is only necessary that the assigned radio resource be unique among all radio resources being currently used for communication by each indoor antenna. The same radio resource may be used by another indoor antenna to communicate with another indoor UE terminal. In other words, simultaneous reuse of the radio resource by different antennas is allowed.

Figure 5C:
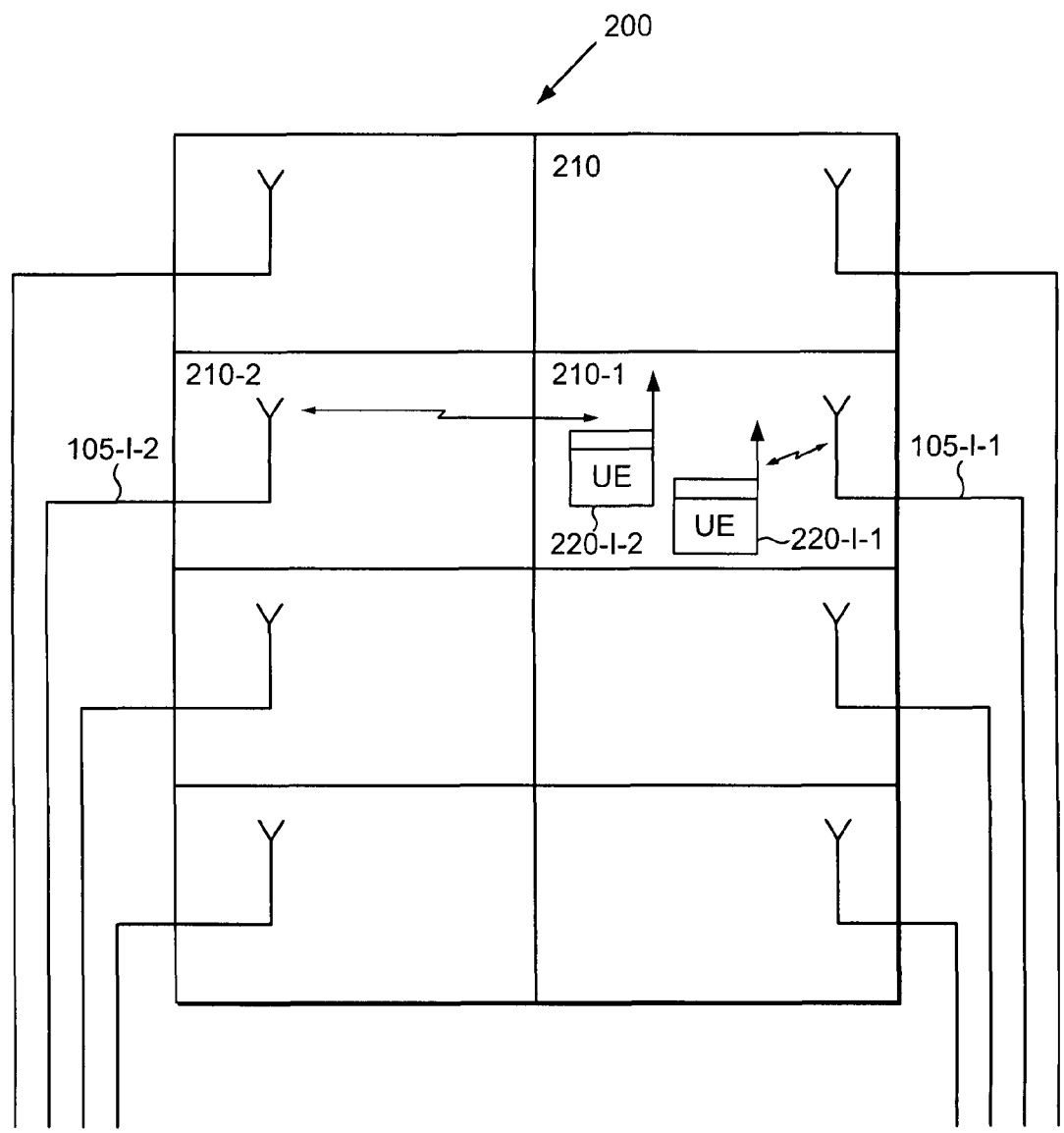

In step 540 as described above, if the radio resource is not available for the indoor antenna receiving the highest quality signal (referred to as a first indoor antenna), then the method goes back to step 510 without assigning any radio resource to communicate with the indoor UE terminal 220-I. Other options are available. An alternate indoor antenna (referred to as a second indoor antenna) may be found that can adequately serve the indoor UE terminal. With reference to FIG. 5C, assume that no more radio resources are available for the first indoor antenna 105-I-1 providing coverage for a first coverage area 210-1. Also assume that the second indoor UE terminal 220-I-2 is attempting access from the first coverage area 210-1. While the first indoor antenna 105-I-1 would receive the highest quality signal from the second indoor UE terminal 220-I-2, the first indoor antenna 105-I-1 would not be able to provide coverage to the second indoor UE terminal 220-I-2 since there are no more radio resources available for the first indoor antenna 105-I-1.

If the second indoor antenna 105-I-2 does have available radio resources and the quality of the signal received by the second indoor antenna 105-I-2 from the second indoor UE terminal 220-I-2 is sufficient (e.g., at or above a predetermined threshold), then the second indoor antenna 105-I-2 can provide coverage for the second indoor UE terminal 220-I-2. Thus, even though the second indoor UE terminal 220-I-2 is not in the second coverage area 210-2, communication can still take place between the base station 100 and the second indoor UE terminal 220-I-2 through the second indoor antenna 105-I-2. This alternate step is depicted in dashed lines in FIG. 5B. As before, in step 540, it is determined whether a radio resource is available for use by the first indoor antenna 105-I-1 receiving the highest quality signal. If the radio resource is not available, then in step 570, it is determined whether a second indoor antenna 105-I-2 is available.

Whether the second indoor antenna 105-I-2 is available can be based on whether there is a second radio resource available for the second indoor antenna 105-I-2 that can be used to communicate with the indoor UE terminal 220-I-2. In other words, the second radio resource is unique among all radio resources currently used by the second indoor antenna 105-I-2. If the second radio resource is available, then the method goes to steps 550 and 560 of assigning the second radio resource and setting the weight factor to ON for the second indoor antenna 105-I-2 for the second radio resource. Otherwise, the method goes back to step 510. The second radio resource assigned to communicate with the indoor UE terminal using the second indoor antenna should be such that the second radio resource does not cause interference for communications between other indoor antennas with other indoor UE terminals. One way to achieve this goal is to group the plurality of coverage areas into two or more reuse zones.

Figure 5D:
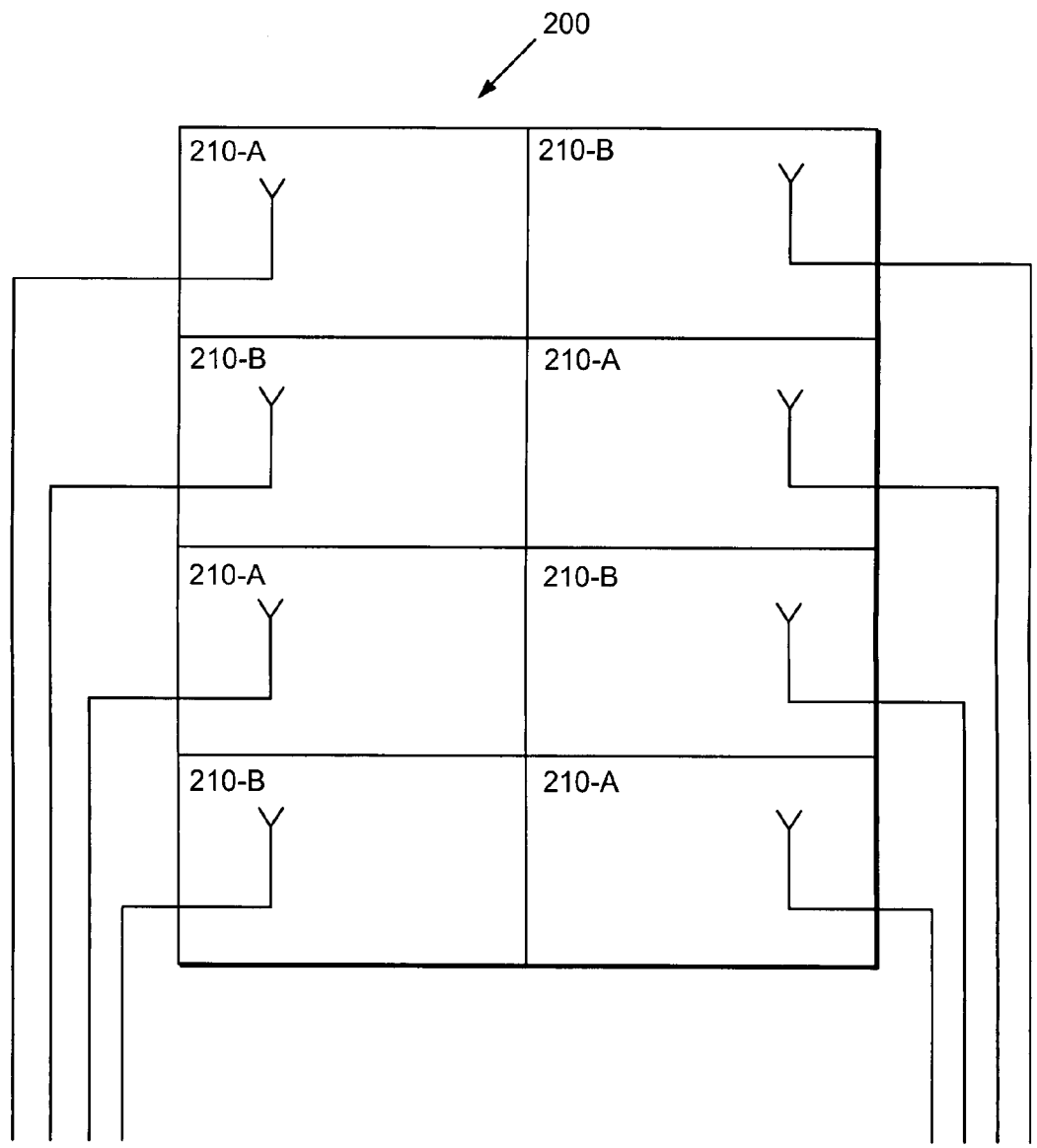

FIG. 5D illustrates an example of reuse zones. As illustrated, the plurality of coverage areas 210 are grouped into reuse zones 210-A and 210-B. A common set of one or more radio resources are allowed to be used within the coverage areas 210 defined by the first reuse zone 210-A. A different common set of one or more radio resources is reused in coverage areas 210 defined by the second reuse zone 210-B. This is an example of achieving spatial division multiple access (SDMA). The reuse zones should be defined such that signals from indoor UE terminals from a reuse zone are attenuated to the extent that they do not cause problematic interference in another coverage area of the same reuse zone. Also, while only two reuse zones are illustrated in FIG. 5D, any number of reuse zones is permitted.

Figure 6A:
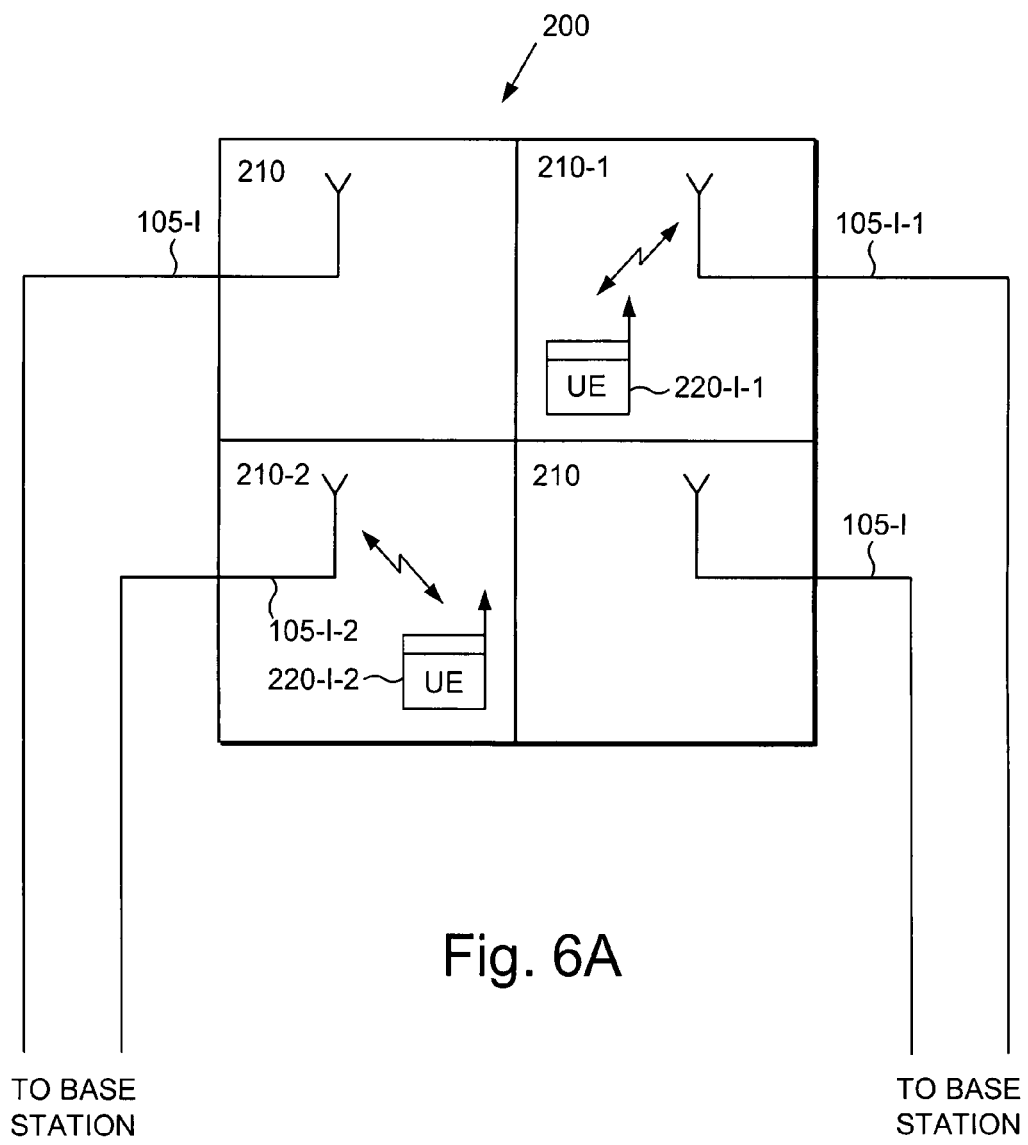
FIGS. 6A and 6B illustrate an example scenario and method of managing one or more radio resources for multiple UE terminals.

Multiple indoor antennas can serve multiple indoor UE terminals. An example of this situation is illustrated in FIG. 6A. As illustrated, a first indoor antenna 105-I-1 provides a communication link between the base station 100 and a first indoor UE terminal 220-I-1 through a first radio resource. Similarly, a second indoor antenna 105-I-2 provides a communication link between the base station 100 and a second indoor UE terminal 220-I-2 through a second radio resource. Since reuse is allowed when there are a plurality of coverage areas, the first and second radio resources can be the same.

Figure 6B:
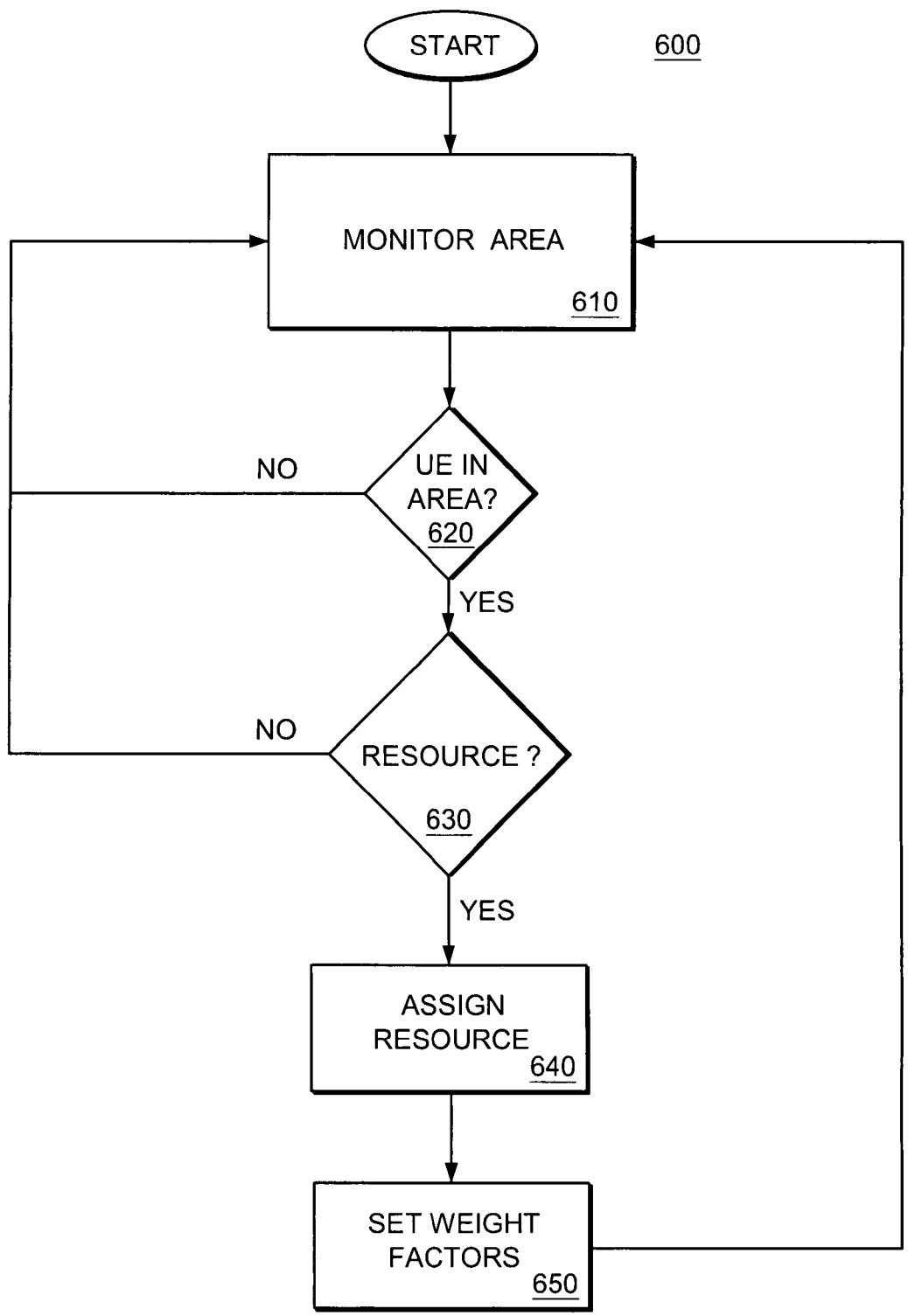

A method 600 for establishing communication with both the first and second indoor UE terminals 220-I-1 and 220-I-2 is illustrated in FIG. 6B. The method 600 starts by determining if an indoor UE terminal is near or in a coverage area served by an indoor antenna in steps 610 and 620. Referring back to FIG. 6A as an example, the first indoor UE terminal 220-I-1 would be determined to be located near or in a first coverage area 210-I served by the first indoor antenna 105-I-1. If no indoor UE terminals are detected, then the method goes back to step 610 as illustrated in FIG. 6B. On the other hand, if the indoor UE terminal is detected to be near or in the coverage area, then it is determined whether or not a radio resource is available for the antenna in step 630. Again referring back to FIG. 6A, it would be determined whether or not the first radio resource is available for the first indoor antenna 105-I-1 to communicate with the first indoor UE terminal 220-I-1. If the first radio resource is not available, then the method goes back to step 610. If the first radio resource is available for the first indoor antenna 105-I, then the first radio resource is assigned and the weight factor is set to ON for the first radio resource for the first indoor antenna 105-I-1 as depicted in steps 640 and 650. Similar steps may be performed to assign a second radio resource for communication with a second indoor UE terminal 220-I-2 through a second indoor antenna 105-I-2.

As indicated above, the first and second radio resources may be the same, e.g., may have the same frequency(ies), time slot(s), and/or spreading code(s). In an example embodiment, the beam controller 125 is configured to assign the first and second radio resources (which are the same) only when the signal qualities from the first and second UE indoor terminals 220-I-1 and 220-I-2 received by the second and first indoor antennas 105-I-2 and 105-I-1, respectively, are both below a predetermined threshold level.

Figure 7A:
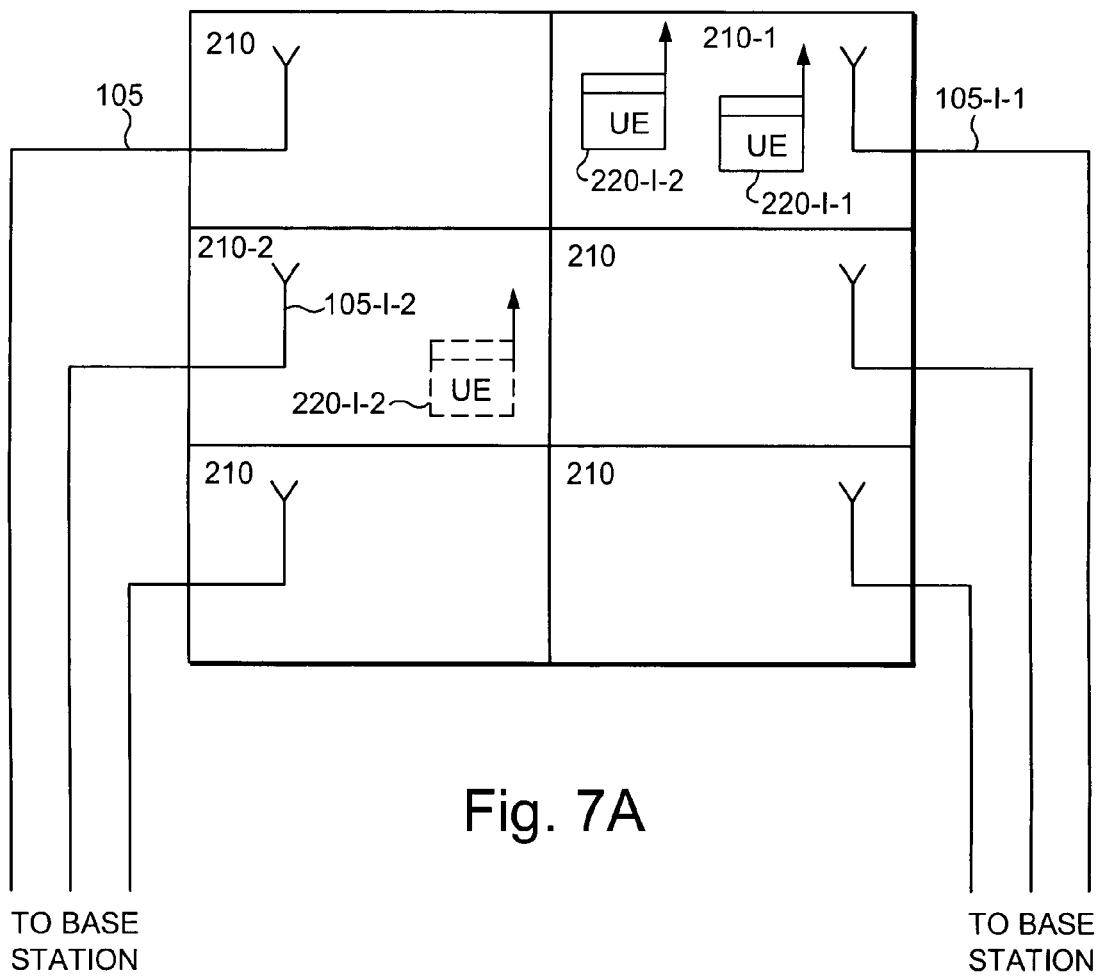
FIGS. 7A and 7B illustrate an example scenario and method of managing the radio resource that occurs when a UE terminal changes location from one coverage area to another.
Figure 7B:
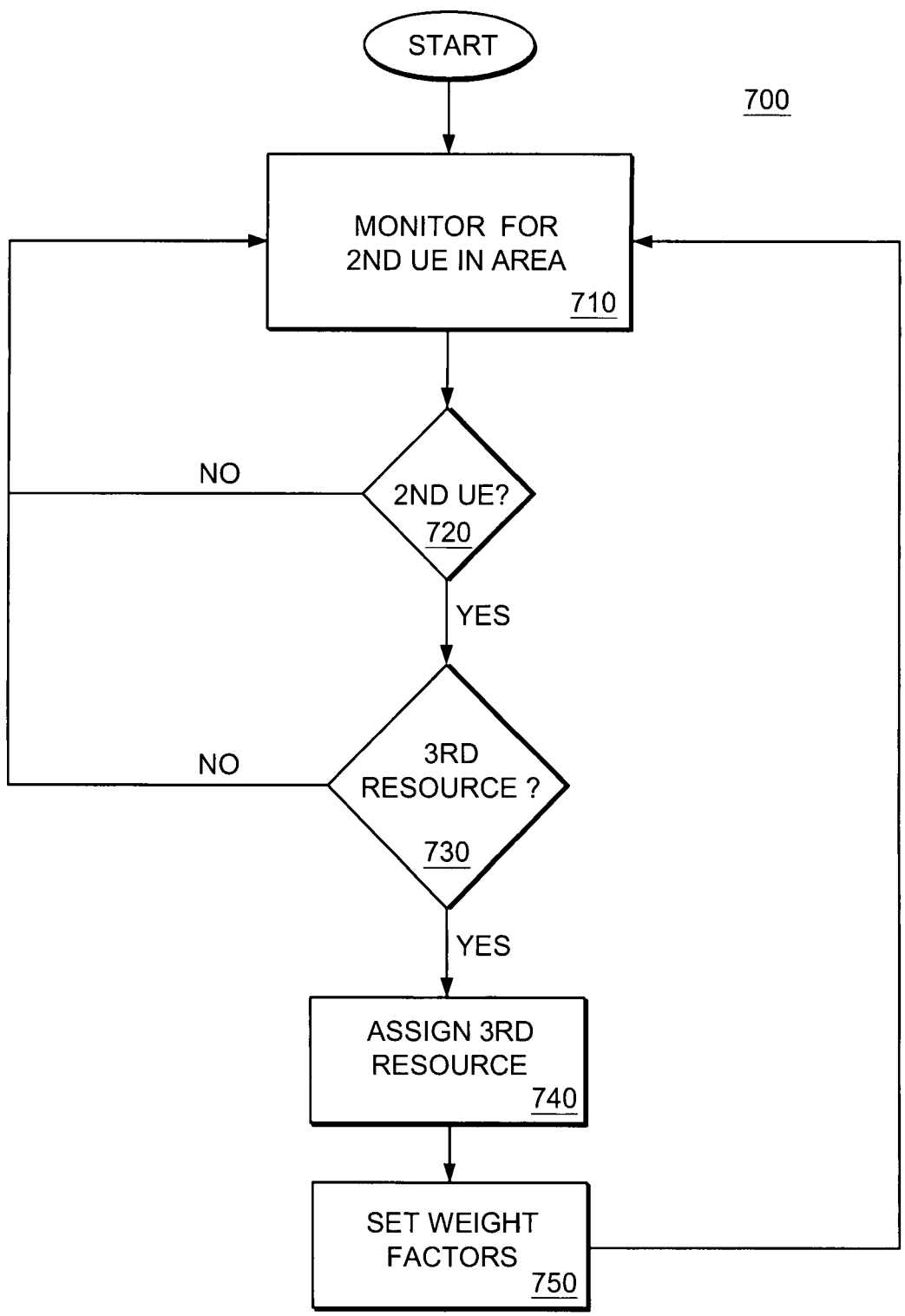

FIGS. 7A and 7B illustrate a scenario in which an indoor UE terminal moves from one coverage area to another coverage area. For explanation purposes, the following is assumed. At time T0, the first and second indoor UE terminals 220-I-1 and 220-I-2 are near or in the first and second coverage areas 210-1 and 210-2, respectively, and are being covered by the first and second indoor antennas 105-I-1 and 105-I-2. In other words, weight factors for the first and second indoor antennas 105-I-1 and 105-I-2 for the first and second radio resources, respectively, are set to ON. At time T1, the second indoor UE terminal 220-I-2 moves to be near or in the first coverage area 210-1 (the movement is shown as dashed a terminal for time T0 and as a solid terminal for time T1).

FIG. 7B illustrates a method 700 for managing the radio resources that occurs when a UE terminal changes location from one coverage area to another. In steps 710 and 720, it is determined whether the second indoor UE terminal 220-I-2 is near or in the first coverage area 210-1. If not, the method goes back to step 710.

If it is determined that the second indoor UE terminal 220-I-2 is near or in the first coverage area 210-1, then in step 730, it is determined whether a third radio resource is available for the first indoor antenna 105-I-1. To prevent interference, the third radio resource should be different from all radio resources currently used by the first indoor antenna 105-I-1 including the first radio resource. If the third radio resource is not available, then the method goes back to step 710.

If the third radio resource is available for the first indoor antenna 105-I-1, then in steps 740 and 750, the third radio resource is assigned and the weight factor of the first indoor antenna 105-I-1 is set to ON for the third radio resource. Note that the second radio resource, which was originally used by the second indoor antenna 105-I-2 to originally communicate with the second indoor UE terminal 220-I-2, now becomes available. Accordingly, the weight factor for the second indoor antenna 105-I-2 is set to OFF for the second radio resource in step 750.

Figure 8:
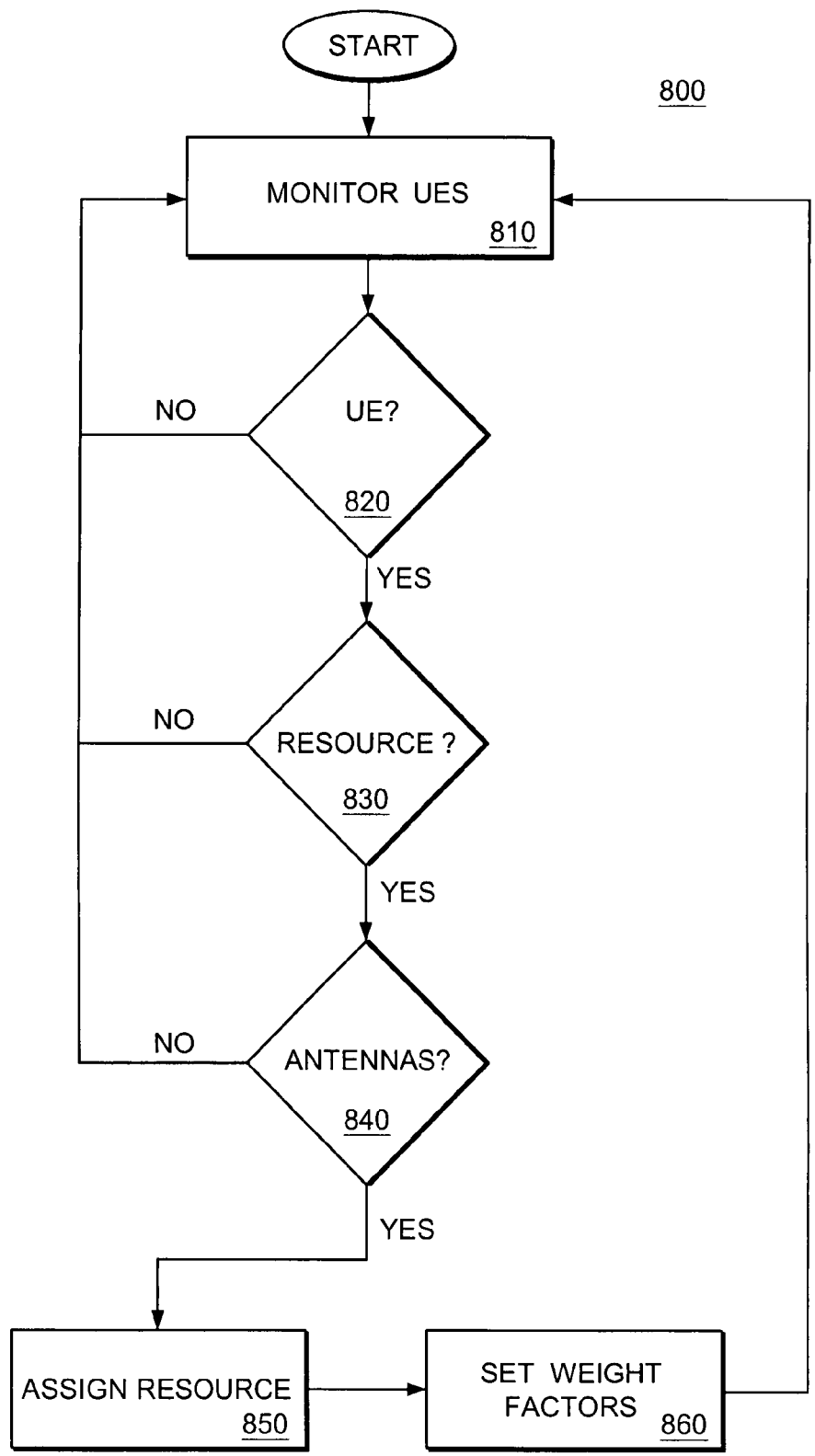
FIG. 8 illustrate another example method of establishing a radio resource between the base station and the UE terminals.

In the examples disclosed in FIGS. 3, 4A and 4B, for each indoor UE terminal 220-I, only one indoor antenna 105-I—the antenna receiving the highest quality signal—is used to communicate with the indoor UE terminal 220-I. In an alternative, a quality of the communication may be enhanced if multiple indoor antennas is used to communicate with each indoor UE terminal. The example method 800 illustrated in FIG. 8 is one such method. In method 800, the base station 100 uses the indoor antennas 105-I to monitor access attempts from the indoor UE terminals 220-I (step 810). In step 820, it is determined whether there is an access attempt from an indoor UE terminal 220-I. If no access attempt is detected, the method goes back to step 810 where monitoring of access attempts continues.

If an access attempt is detected, then it is determined whether a radio resource is available in step 830. If no radio resource is available, then the method goes back to step 810. If the radio resource is available, then in step 840, it is determined whether there is at least one indoor antenna 105-I that receives a signal from the indoor UE terminal 220-I that is of sufficient quality, i.e., the quality of the signal received by the at least one indoor antenna 105-I is at or above a predetermined threshold level. If no indoor antenna receives sufficient quality signal from the indoor UE terminal, then the method goes back to step 810.

If there are one or more indoor antennas 105-I that receive the signal of sufficient quality, then the radio resource is assigned in step 850. The assigned radio resource is different from all other radio resources currently being used by the indoor antennas 105-I for communication with other indoor UE terminals 220-I.

Then in step 860 in which the weight factor is set to ON for the radio resource for all indoor antenna 105-I that receives the sufficient quality signal and the weight factors of all other indoor antennas 105-I are set to OFF for the radio resource.

In an alternative embodiment, step 860 can be modified to set the weight factors of a predetermined number of indoor antennas 105-I to ON for the radio resource even though there may be more than the predetermined number of antennas that receive the signal of sufficient quality. In this instance, the number of indoor antennas that will have the weight factor set to ON for the radio resource ranges between one and the predetermined number.

For communication, the base station 100, and specifically the beam controller 125, sets the weight factors for the indoor antennas 105-I for dedicated communication with individual indoor UE terminals 220-I. The beam controller 125 also sets the weight factors for the antennas for broadcast communication with multiple indoor UE terminals. For the dedicated communication with individual terminals, the beam controller 125 is configured to selectively set the weight factors for the indoor antennas 105-I through dedicated communication channels. For broadcast communication, the beam controller 125 is configured to set the weight factors of the multiple indoor antennas on through a broadcast channel.

Figure 9A:
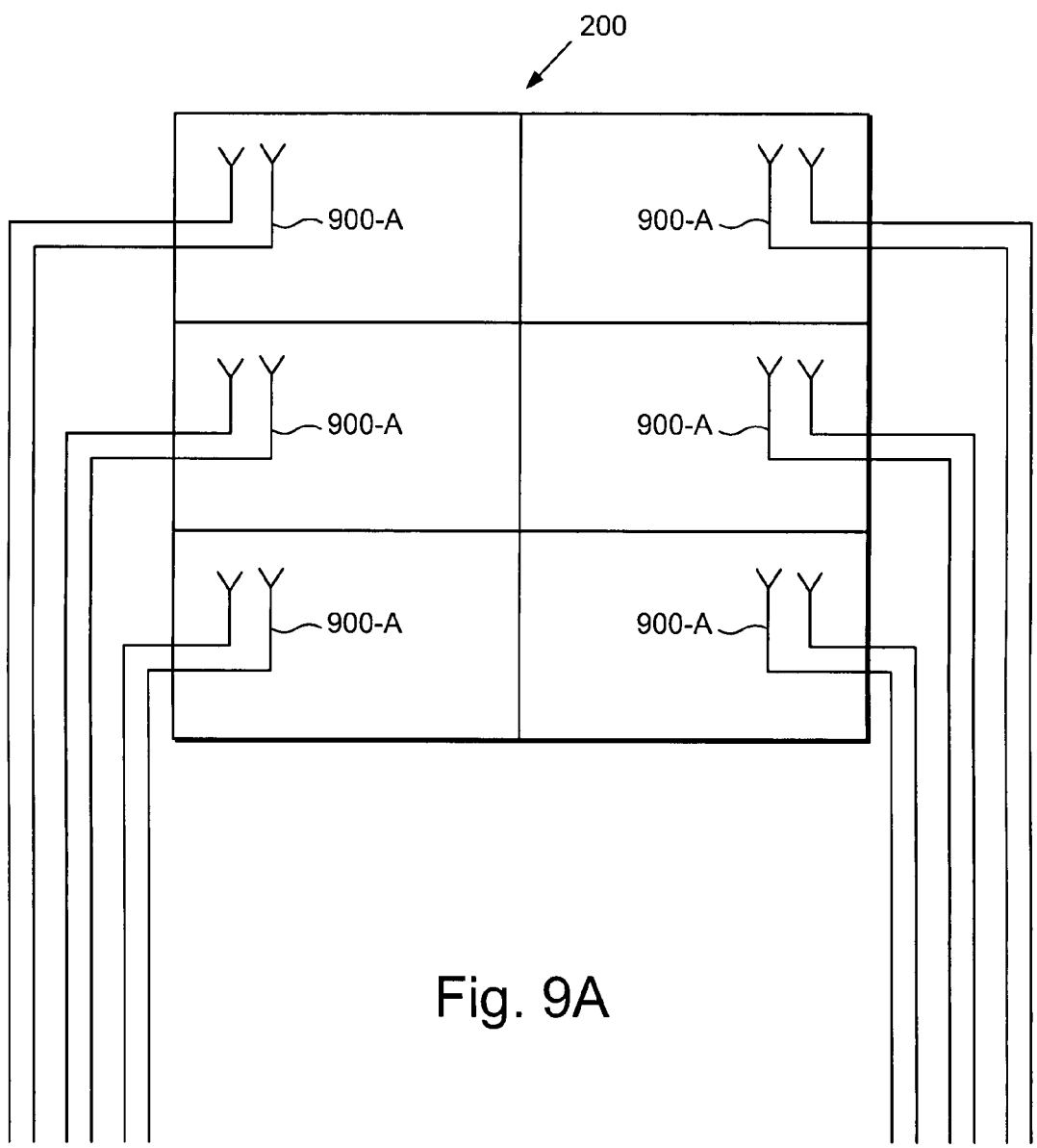
FIGS. 9A and 9B illustrate example antenna types.
Figure 9B:
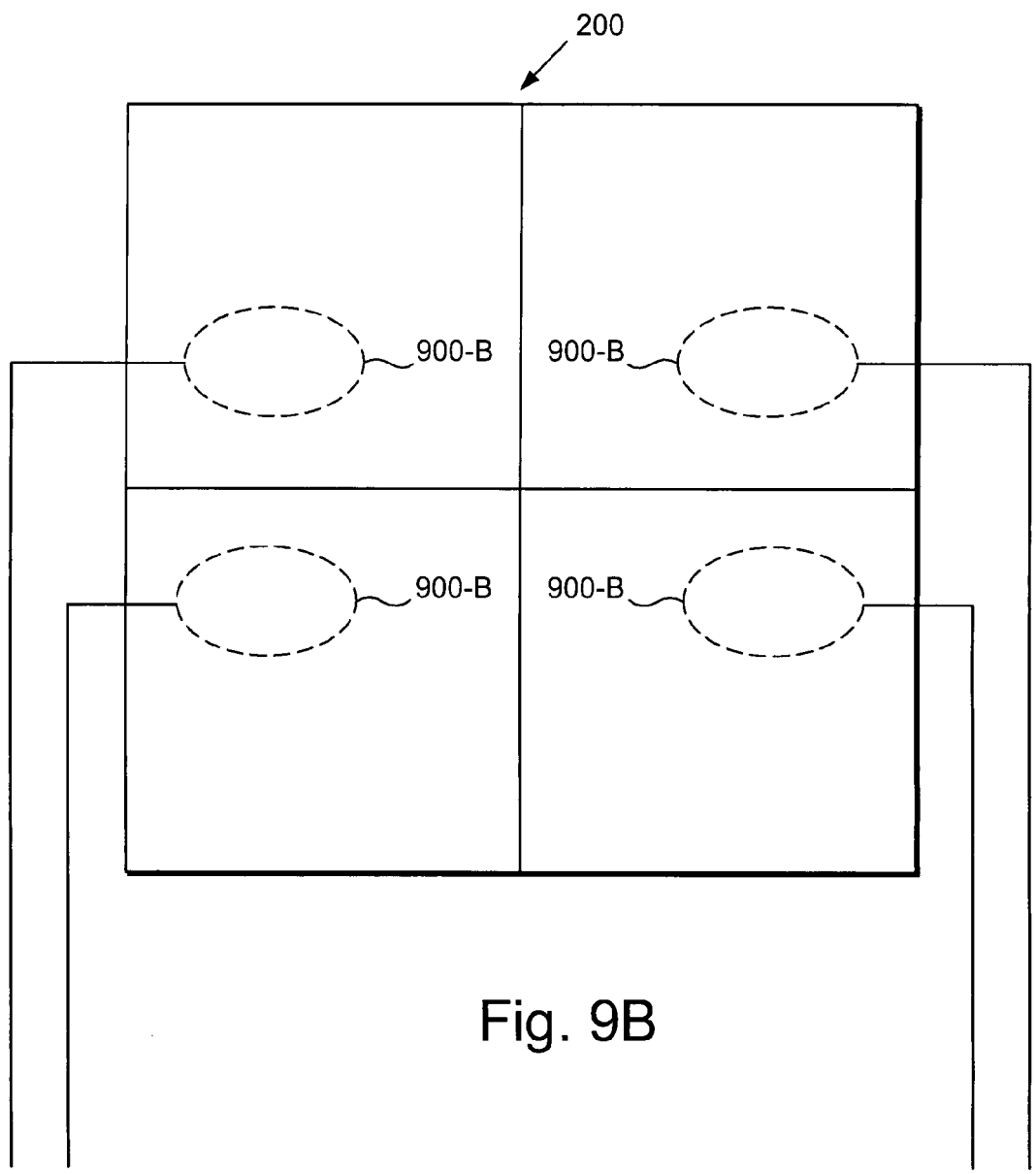
Figure 10:
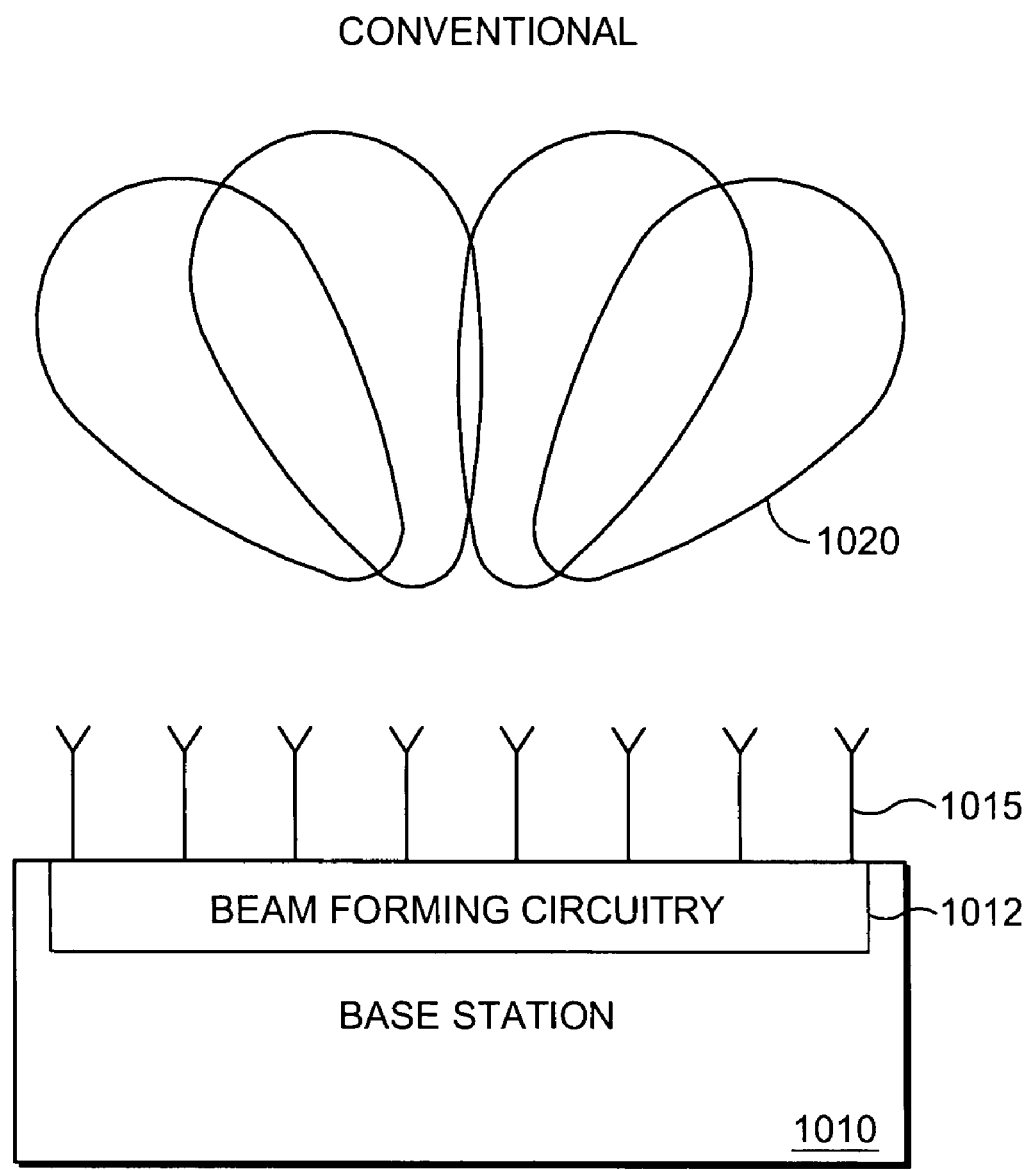
FIG. 10 illustrates a base station with multiple antennas producing multiple beam lobes in a conventional manner.

In the illustrated examples of FIGS. 1-8, each antenna is shown to have a single discrete antenna element. Each antenna may have multiple antenna elements 900-A as shown in FIG. 9A. Each antenna element can be individually controlled by the base station. Alternatively, a leaky cable 900-B type of antenna may be used as illustrated in FIG. 9B. In general, the indoor antennas can be any physically elongated or physically extended type.

One or more indoor antenna elements can be active components, i.e., the RF-circuitry can be separated into several components, one for each antenna element, and located at the same place as the antenna. This is possible, for example, by using a main-remote base station architecture where fiber cables are used instead of RF feeder cables from the base station to the antenna/RF-unit. This has the advantage that the RF-losses are reduced or removed entirely, which in turn reduces the energy requirements for the base station. Further, this may also remove the necessity of using a repeater.

When multiple antenna elements are incorporated such as illustrated in FIG. 9A, Multiple Input Multiple Output (MIMO) scheme can be used. The antenna elements of one or more indoor antennas can be physically separated in a same general space. More preferably, the antenna elements would have different polarizations. For example, when two antenna elements are employed, each antenna may have orthogonal polarizations. In this way, two separate data streams may be sent on these two antenna elements, on the same time slot and on the same frequency and possibly—but not necessarily—with some different coding/training sequences. This MIMO scheme can double the effective data rate. Other MIMO schemes are available, are generally known, and can be applied without departing from the scope of the embodiments.

One or more of the described embodiments offer many advantages. For example, spectral efficiency of the communication network is improved through reuse of radio resources. Also, cost is reduced since the existing outdoor hardware and software can be reused. Further, flexibility is increased. For example, a base station can be configured as only for outdoor, only for indoor, or for both outdoor and indoor settings. The settings can be modified as desired. The embodiments do not present any additional requirements on the UE terminal.

For a coverage area, more than one antenna can provide coverage for one UE terminal with the same radio resource, i.e., it is possible to set multiple antennas as ON for the radio resource, and transmit/receive at the same time to serve the one UE terminal with the same radio resource. This diversity in both uplink and downlink can bring about radio link gain.

In another scenario for a coverage area, more than one antenna can provide coverage for one UE terminal with the different radio resources, i.e., it is possible to set multiple antennas as ON for different resources, and transmit/receive at the same time to serve one UE terminal with the different radio resources. This multi-stream communication in both uplink and downlink has the potential to increase capacity of the network.

The features of the one or more disclosed examples may be implemented as a program stored in a computer readable medium. The computer readable medium can include, but is not limited to, CDs, DVDs, magnetic hard disks, RAMs, and ROMs.

While described with reference to the example embodiments thereof, those skilled in the art will be able to make various modifications to the described embodiments. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible. The invention is defined in the following claims and their equivalents.

What is claimed is:

1. A base station for communicating with one or more user equipment (UE) terminals, comprising:
   a plurality of antennas configured to transmit and receive wireless signals, corresponding to radio resources, to and from the UE terminals;
   a radio frequency (RF) unit operatively coupled to the plurality of antennas and configured to control power of signals emanating from the plurality of antennas;

a beam forming unit operatively coupled to the RF unit and configured to scale the power of the signal emanating from each antenna by a weight factor for each radio resource; and a beam controller configured to control the beam forming unit by setting the weight factor for each antenna for each radio resource, wherein multiple indoor antennas of the plurality of antennas are provided for indoor coverage and multiple outdoor antennas of the plurality of antennas are provided outdoors, where the indoors includes an interior space of a physical structure, wherein the beam controller is configured to set the weight factor for each indoor antenna for each radio resource to control transmission/reception of the wireless signals for indoor UE terminals reachable by the indoor antenna, a number of weight factor values being two for each indoor antenna for each radio resource, wherein the weight factor for each indoor antenna is one of ON and OFF for each radio resource, wherein the beam controller is configured to set the weight factor for each outdoor antenna to control a direction and/or a width of wireless signal beams for transmission/reception of the wireless signals for outdoor UE terminals reachable by the outdoor antennas, wherein the weight factor for each outdoor antenna is one of a number of outdoor weight factor values for each radio resource, the number of outdoor weight factor values being three or more, and wherein each radio resource is individually identifiable based on at least one of a frequency, a time slot, or a spreading code.

2. The base station of claim 1, wherein the beam controller is configured to:
monitor an access attempt from an indoor UE terminal through the indoor antennas,
determine which indoor antenna is receiving highest quality signal from the indoor UE terminal,
assign a radio resource to communicate with the indoor UE terminal, wherein the radio resource is different from all other radio resources currently used by all of the indoor antennas for communication with the indoor UE terminals, and
set the weight factor associated with the indoor antenna receiving the highest quality signal to ON for the radio resource and set the weight factors of all other indoor antennas to OFF for the radio resource.

3. The base station of claim 2, wherein the beam controller is configured to assign the radio resource when it determines that the radio resource is available for the indoors.

4. The base station of claim 2,
wherein the indoor antenna is a first indoor antenna, and
wherein the beam controller is configured to:
determine if a second indoor antenna is receiving a higher quality signal from the UE terminal than the first indoor antenna, and
set the weight factor of the second indoor antenna to ON for the radio resource and set the weight factor of the first indoor antenna to OFF when it is determined that the second indoor antenna is receiving the higher quality signal from the UE terminal than the first indoor antenna.

5. The base station of claim 1,
wherein the indoors is divided into a plurality of coverage areas such that each indoor antenna is configured to provide coverage for a corresponding coverage area, and wherein the beam controller is configured to:
monitor an access attempt from an indoor UE terminal located indoors through the multiple indoor antennas,
determine which indoor antenna is receiving highest quality signal from the UE terminal,
assign a radio resource to communicate with the indoor UE terminal, wherein the radio resource is different from all other radio resources currently used by the indoor antenna receiving the highest quality signal, and
set the weight factor associated with the indoor antenna receiving the highest quality signal to ON for the radio resource.

6. The base station of claim 5,
wherein the indoor antenna receiving the highest signal is a first indoor antenna and the radio resource is a first radio resource, and
wherein the beam controller is configured to:
determine if the first radio resource is available for use by the first indoor antenna,
determine if a second indoor antenna is available when it is determined that the first radio resource is not available for use by the first indoor antenna,
assign a second radio resource to communicate with the indoor UE terminal, wherein the second radio resource is different from all other radio resources currently used by the second indoor antenna, and
set the weight factor associated with the second indoor antenna to ON for the second radio resource.

7. The base station of claim 6, wherein the beam controller is configured to determine that the second indoor antenna is available when a quality of the signal from the indoor UE terminal received by the second indoor antenna is at or above a predetermined threshold level.

8. The base station of claim 1,
wherein the indoors is divided into a plurality of coverage areas such that each indoor antenna is configured to provide coverage for a corresponding coverage area,
wherein the beam controller is configured to:
assign a first radio resource to communicate with a first indoor UE terminal located near or in a first coverage area being covered by a first indoor antenna and set the weight factor of the first indoor antenna to ON for the first radio resource, wherein the first radio resource is different from all other radio resources currently used by the first indoor antenna, and
assign a second radio resource to communicate with a second indoor UE terminal located near or in a first coverage area being covered by a second indoor antenna and set the weight factor of the second indoor antenna to ON for the second radio resource, wherein the second radio resource is different from all other radio resources currently used by the second indoor antenna.

9. The base station of claim 8, wherein the first and second radio resources have the same frequencies, time slots, and spreading codes.

10. The base station of claim 8,
wherein the plurality of coverage areas are grouped into one or more reuse zones,
wherein in each reuse zone comprises two or more coverage areas, and
wherein within each reuse zone, a common set of radio resources are allowed to be reused within the coverage areas of the reuse zone.

11. The base station of claim 9, wherein the beam controller is configured to assign the first and second radio resources to communicate with the first and second indoor UE terminals, respectively, when a signal quality from the first indoor UE terminal received by the second indoor antenna is below a predetermined threshold level and a signal quality from the second indoor UE terminal received by the first indoor antenna is below the predetermined threshold level.

12. The base station of claim 8,
wherein the radio resource is a first radio resource, and
wherein the beam controller is configured to:
determine whether the second UE terminal is near or in the first coverage area,
assign a third radio resource, different from the first radio resource, when it is determined that the second UE terminal is near or in the first coverage area,
set the weight factor of the first indoor antenna to ON for the third radio resource, and
set the weight factor of the second indoor antenna to OFF for the second radio resource.

13. The base station of claim 1, wherein the beam controller is configured to:
monitor an access attempt from an indoor UE terminal through the multiple indoor antennas,
determine whether a signal quality from the indoor UE terminal received by at least one indoor antenna is at a predetermined threshold level or higher,
assign a radio resource to communicate with the indoor UE terminal when it is determined that there is at least one indoor antenna that receives the signal quality at the predetermined threshold level or higher, wherein the radio resource is different from all other radio resources currently used by all of the indoor antennas for communication with the indoor UE terminals, and
set the weight factor to ON for the radio resource for each indoor antenna that is determined to receive the signal quality at the predetermined threshold level or higher and set the weight factors of all other indoor antennas to OFF for the radio resource.

14. The base station of claim 1, wherein the beam controller is configured to:
selectively set the weight factors for the indoor antennas for dedicated communication with individual indoor UE terminals through dedicated channels, and
set the weight factors for multiple indoor antennas to ON for broadcast communication with indoor UE terminals through a broadcast channel.

15. The base station of claim 1, wherein in one or more of the indoor antennas is a physically elongated or a physically extended type.

16. The base station of claim 1, wherein in one or more of the indoor antennas includes a plurality of antenna elements.

17. The base station of claim 16, wherein each of the plurality of antenna elements of at least one indoor antenna are polarized differently from other antenna elements of the same plurality of antenna elements.

18. The base station of claim 1, wherein in one or more of the indoor antennas is a leaky cable.

19. The base station of claim 1, wherein in one or more of the indoor antennas are active antennas.

20. A method for communication between a base station and one or more user equipment (UE) terminals, wherein the base station comprises a plurality of antennas configured to transmit and receive wireless signals, corresponding to radio resources, to and from the UE terminals, a radio frequency (RF) unit operatively coupled to the plurality of antennas and configured to control power of signals emanating from the plurality of antennas, a beam forming unit operatively coupled to the RF unit and configured to scale the power of the signal emanating from each antenna by a weight factor for each radio resource, and a beam controller configured to control the beam forming unit, wherein multiple indoor antennas of the plurality of antennas are provided for indoor coverage and multiple outdoor antennas of the plurality of antennas are provided outdoors where the indoors includes an interior space of a physical structure, the method comprising:
the base station setting the weight factor for each indoor antenna for each radio resource to control transmission/reception of the wireless signals for indoor UE terminals reachable by the indoor antenna; and
the base station setting the weight factor for each outdoor antenna to control a direction and/or a width of wireless signal beams for transmission/reception of the wireless signals for outdoor UE terminals reachable by the outdoor antennas,
wherein a number of weight factor values being two for each indoor antenna for each radio resource, the weight factor for each indoor antenna is being one of ON and OFF for each radio resource,
wherein the weight factor for each outdoor antenna is one of a number of outdoor weight factor values for each radio resource, the number of outdoor weight factor values being three or more, and
wherein each radio resource is individually identifiable based on at least one of a frequency, a time slot, or a spreading code.

21. The method of claim 20, further comprising:
monitoring an access attempt from an indoor UE terminal through the indoor antennas;
determining which indoor antenna is receiving highest quality signal from the indoor UE terminal;
assigning a radio resource to communicate with the indoor UE terminal, wherein the radio resource is different from all other radio resources currently used by all of the indoor antennas for communication with the indoor UE terminals; and
setting the weight factor associated with the indoor antenna receiving the highest quality signal to ON for the radio resource and setting the weight factors of all other indoor antennas to OFF for the radio resource.

22. The method of claim 20, wherein the indoors is divided into a plurality of coverage areas such that each indoor antenna is configured to provide coverage for a corresponding coverage area, the method further comprising:
monitoring an access attempt from an indoor UE terminal located indoors through the multiple indoor antennas;
determining which indoor antenna is receiving highest quality signal from the UE terminal; and
assigning a radio resource to communicate with the indoor UE terminal, wherein the radio resource is different from all other radio resources currently used by the indoor antenna receiving the highest quality signal, and
setting the weight factor associated with the indoor antenna receiving the highest quality signal to ON for the radio resource.

23. A non-transitory computer readable medium in which a program is stored for controlling a base station to communicate with one or more user equipment (UE) terminals, wherein the base station comprises a plurality of antennas configured to transmit and receive wireless signals, corresponding to radio resources, to and from the UE terminals, a radio frequency (RF) unit operatively coupled to the plurality of antennas and configured to control power of signals emanating from the plurality of antennas, a beam forming unit operatively coupled to the RF unit and configured to scale the power of the signal emanating from each antenna by a weight factor for each radio resource, and a beam controller configured to control the beam forming unit, wherein multiple indoor antennas of the plurality of antennas are provided for indoor coverage and multiple outdoor antennas of the plurality of antennas are provided outdoors where the indoors includes an interior space of a physical structure, the program comprising instructions for:

setting the weight factor for each indoor antenna for each radio resource to control transmission/reception of the wireless signals for indoor UE terminals reachable by the indoor antenna; and setting the weight factor for each outdoor antenna to control a direction and/or a width of wireless signal beams for transmission/reception of the wireless signals for outdoor UE terminals reachable by the outdoor antennas, wherein a number of weight factor values being two for each indoor antenna for each radio resource, the weight factor for each indoor antenna being one of ON and OFF for each radio resource, wherein the weight factor for each outdoor antenna is one of a number of outdoor weight factor values for each radio resource, the number of outdoor weight factor values being three or more, and wherein each radio resource is individually identifiable based on at least one of a frequency, a time slot, or a spreading code.

24. The base station of claim 1, wherein when the weight factor is set to ON, power emanating from each indoor antenna is substantially same.

25. The method of claim 20, wherein when the weight factor is set to ON, power emanating from each indoor antenna is substantially same.

26. The non-transitory computer readable medium of claim 23, wherein when the weight factor is set to ON, power emanating from each indoor antenna is substantially same.

* * * * *

UNITED STATES PATENT AND TRADEMARK OFFICE
CERTIFICATE OF CORRECTION

| | | |
|---|---|---|
| PATENT NO. | : 8,055,300 B2 | Page 1 of 1 |
| APPLICATION NO. | : 11/896038 | |
| DATED | : November 8, 2011 | |
| INVENTOR(S) | : Andersson et al. | |

It is certified that error appears in the above-identified patent and that said Letters Patent is hereby corrected as shown below:

In Column 16, Line 18, in Claim 20, after "antenna" delete "is".

Signed and Sealed this
Twenty-seventh Day of March, 2012

David J. Kappos
*Director of the United States Patent and Trademark Office*